(12) United States Patent
Zimmerman

(10) Patent No.: US 7,983,929 B2
(45) Date of Patent: *Jul. 19, 2011

(54) TECHNIQUE FOR DETERMINING AND REPORTING REDUCTION IN EMISSIONS OF GREENHOUSE GASES AT A SITE

(75) Inventor: Patrick R. Zimmerman, Rapid City, SD (US)

(73) Assignee: South Dakota School of Mines and Technology, Rapid City, SD (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/499,706

(22) Filed: Jul. 8, 2009

(65) Prior Publication Data

US 2009/0287520 A1 Nov. 19, 2009

Related U.S. Application Data

(63) Continuation-in-part of application No. 12/045,583, filed on Mar. 10, 2008, now Pat. No. 7,716,063, which is a continuation of application No. 10/364,128, filed on Feb. 10, 2003, now Pat. No. 7,457,758.

(51) Int. Cl.
 G06Q 10/00 (2006.01)
 G06F 9/44 (2006.01)
(52) U.S. Cl. .................... 705/1.1; 705/7.11
(58) Field of Classification Search .................. 705/1.1, 705/7, 8, 10, 11, 26, 37, 36 R, 412, 28, 29, 705/35, 7.11, 7.12, 7.13, 30; 700/266; 702/19; 119/174; 47/58.1 R; 703/2, 5, 11, 12
See application file for complete search history.

(56) References Cited

U.S. PATENT DOCUMENTS

| 2002/0143693 | A1* | 10/2002 | Soestbergen et al. ........... 705/37 |
| 2007/0295590 | A1* | 12/2007 | Weinberg et al. ................ 201/17 |
| 2008/0147465 | A1 | 6/2008 | Raines et al. |
| 2009/0132176 | A1 | 5/2009 | McConnell et al. |

OTHER PUBLICATIONS

Canada to regulate greenhouse-gas, other air emissions; Oil & Gas Journal v105n19 pp. 34-35; May 21, 2007; CODEN: OIGJAV; ISSN: 0030-1388 Journal Code: OGJ; 2 pages.*
PCT International Search report, International application No. PCT/US10/41217, Applicant South Dakota School of Mines and Technology, mailed Sep. 21, 2010.

* cited by examiner

*Primary Examiner* — Igor Borissov
(74) *Attorney, Agent, or Firm* — Marsh Fischmann & Breyfogle LLP; Kent A. Lembke

(57) ABSTRACT

A system for generating standardized greenhouse gas emission reduction credits based on mitigation of greenhouse gas emissions at a site resulting from use of renewable carbon as a fuel at the site to produce energy in substitution for previous use of a fossil fuel at the site, includes a computer, at least one database accessible by the computer and containing past site-specific data and subsequent site-specific data regarding the at least one variable impacting emissions of the greenhouse gas generated from the use of the renewable carbon as a fuel for generating energy at the site, a greenhouse gas emissions modeling module, and at least one interface to the computer, for outputting a report of the identified quantity of the standardized greenhouse gas emission reduction credits.

18 Claims, 12 Drawing Sheets

| Method Code | $\dfrac{\partial E}{\partial Flow}$ | $\dfrac{\partial E}{\partial H_2O}$ | $\dfrac{\partial E}{\partial O_2}$ | $\dfrac{\partial E}{\partial CO_2}$ | $\dfrac{\partial E}{\partial F_c}$ | $\dfrac{\partial E}{\partial F}$ |
|---|---|---|---|---|---|---|
| Wet CO2 | 1 | | | 1 | | |
| Dry CO2 | 1 | $\dfrac{(H_2O_{avg})}{(100 - H_2O_{avg})}$ | | 1 | | |
| Wet O2 | 1 | $\dfrac{H_2O_{avg}}{100\left(1 - \dfrac{H_2O_{avg}}{100} - \dfrac{O_{2avg}}{20.9}\right)}$ | $\dfrac{O_{2avg}}{20.9\left(\dfrac{100 - \%H_2O}{100}\right) - O_{2avg}}$ | | 1 | 1 |
| Dry O2 | 1 | $\dfrac{(H_2O_{avg})}{(100 - H_2O_{avg})}$ | $\dfrac{(O_{2avg})}{(20.9 - O_{2avg})}$ | | 1 | 1 |

| Method Code | $\frac{\partial E}{\partial Flow}$ | $\frac{\partial E}{\partial H_2O}$ | $\frac{\partial E}{\partial O_2}$ | $\frac{\partial E}{\partial SO_2}$ |
|---|---|---|---|---|
| SO2 Wet | 1 | | | 1 |
| SO2 Dry | 1 | $\frac{(H_2O_{ref})}{(100-H_2O_{ref})}$ | | 1 |

FIG. 12

| Method Code | $\frac{\partial W_{os\&}}{\partial W_c}$ | $\frac{\partial W_{os\&}}{\partial CO_2} \cdot \frac{\partial W_{CO_2}}{\partial C\%}$ | $\frac{\partial E}{\partial Q_s} \cdot \frac{\partial E}{\partial S_{os\&}}$ | $\frac{\partial E}{\partial Q_p} \cdot \frac{\partial E}{\partial S_{ppm}}$ |
|---|---|---|---|---|
| Appendix D | | | $\frac{Q_{stk\_total} * S_{stk}}{Q_{stk\_total} * S_{stk} + Q_{pipe\_total} * S_{ppm}}$ | $\frac{Q_{pipe\_total} * S_{ppm}}{Q_{stk\_total} * S_{stk} + Q_{pipe\_total} * S_{ppm}}$ |

| Method Code | $\frac{\partial H}{\partial Tow}$ | $\frac{\partial H}{\partial H_2O}$ | $\frac{\partial H}{\partial O_2}$ | $\frac{\partial H}{\partial CO_2}$ | $\frac{\partial H}{\partial F_i}$ | $\frac{\partial H}{\partial F}$ |
|---|---|---|---|---|---|---|
| Wet CO2 | 1 | | | 1 | 1 | |
| Dry CO2 | 1 | $\frac{(H_2O_{wg})}{(100-H_2O_{stg})}$ | | 1 | 1 | |
| Wet O2 | 1 | $100\left(1-\frac{H_2O_{stg}}{100}-\frac{O_{2wg}}{20.9}\right)$ | $\frac{O_{2wg}}{20.9\left(\frac{100-\%H_2O}{100}\right)-O_{2wg}}$ | | | 1 |
| Dry O2 | 1 | $\frac{(H_2O_{wg})}{(100-H_2O_{stg})}$ | $\frac{(O_{2wg})}{(20.9-O_{2wg})}$ | | | 1 |

FIG. 15

| Method Code | $\frac{\partial H}{\partial Q_e}, \frac{\partial H}{\partial GCV_g}$ | $\frac{\partial H}{\partial Q_c}, \frac{\partial H}{\partial GCV_c}$ | $\frac{\partial H}{\partial GCV}$ | $\frac{\partial H}{\partial M_c}$ |
|---|---|---|---|---|
| Fuel | $\frac{H_{gas\ used}}{H_{oil\ used} + H_{gas\ used}}$ | $\frac{H_{oil\ used}}{H_{oil\ used} + H_{gas\ used}}$ | | |
| Appendix D | | | 1 | 1 |

TECHNIQUE FOR DETERMINING AND REPORTING REDUCTION IN EMISSIONS OF GREENHOUSE GASES AT A SITE

RELATED APPLICATIONS

The present application is a continuation-in-part of co-pending U.S. patent application Ser. No. 12/045,583 filed Mar. 10, 2008, which is a continuation of U.S. patent application Ser. No. 10/364,128 filed Feb. 10, 2003, which issued Nov. 25, 2008, under U.S. Pat. No. 7,457,758, both of said applications being incorporated herein in their entireties by this reference.

BACKGROUND OF THE INVENTION

1. Field of the Invention

This invention generally relates to a method and apparatus for determining standardized carbon emission reduction credits and, more particularly, to a method and apparatus for generating, quantifying and confirming standardized carbon emission reduction credits and reserve carbon emission reduction credits.

2. Description of the Prior Art

An accelerating rate of change in the amounts of trace gases in the earth's atmosphere has the potential to modify the earth's energy balance, which may result in a variety of consequences. These trace gases are often referred to as greenhouse gases and include carbon dioxide. Although there is disagreement concerning the potential threats or benefits of this change, there is widespread agreement in the global community that it is prudent to enact policies to attempt to slow down the rate of change. At the same time, research is underway to predict the consequences of increasing greenhouse gas concentrations and to develop the technology to economically limit those increases. All current protocols have established emission reduction targets that define 1990 as the base year and specify reductions as a fractional percentage of emission rates during that base year.

The increasing concentration of greenhouse gases in the atmosphere is a global issue. For example, carbon dioxide emitted from a power plant into the atmosphere has a lifetime of approximately 100 years and may be distributed globally. As a result, at least for the issue of atmospheric greenhouse gases, the geographic location where the greenhouse gases are removed from the atmosphere is less important than the fact that they are removed.

One of the key provisions of many national strategies to limit the rate of growth in the amounts of atmospheric greenhouse gases is the concept of emissions trading. Emissions trading is a process whereby specific target emission rates of certain greenhouse gases are set for specific industries. A member of the industry who achieves measured emissions below the target rates may trade the difference on the open market to another who exceeds, or forecasts that it will exceed, its own emission targets. An entity responsible for measured emissions above its target rates may be subject to fines or other sanctions. The objective is to reduce the overall emission of greenhouse gases in the atmosphere, even if the emissions of one particular source are not decreased, or indeed are increased.

The unit of measure of tradable carbon emissions that has been generally accepted is commonly known as the Carbon Emission Reduction Credit, or CERC, which is equivalent to one metric ton of carbon dioxide gas (or other greenhouse gas equivalent) that is not emitted into the earth's atmosphere due to a human-caused change. That is, a CERC can be generated for human activities that have occurred since 1990 that have resulted in a reduction of business-as-usual emissions of greenhouse gases.

For example, CERCs can be generated through energy efficiency gains of fossil fuel technology, substitution of biofuels for fossil fuels, or removal of greenhouse gases from industrial gas streams. CERCs also can be generated by sequestration of atmospheric carbon dioxide into land or water, e.g., by reforesting land or through implementation of agricultural practices that increase the storage of organic matter in the soil.

A market is emerging for trading CERCs. One type of CERC trading involves an industrial consortium, where each industrial entity determines a rough estimate of the number of CERCs generated by its activity or needed from others due to its activity. If an individual entity has generated CERCs by changing its business-as-usual activity, e.g., by reducing the amounts of greenhouse gases emitted, it can trade the CERCs to others in the consortium.

There also have been entities involved specifically in CERC trading based on increasing the storage of carbon in soil. For example, in 1999 a consortium of Canadian power companies hired an insurance company to contractually obligate a group of Iowa farmers to twenty years of no-till farming. Based on general data, a broker for the power companies assumed that this land management practice would result in sufficient sequestration of carbon into the soil to generate CERCs. The power companies also purchased an insurance policy for protection against the possibility that no CERCs, or insufficient CERCs, would be generated by this arrangement. This trade was designed by the consortium of power companies to minimize the price that the farmers were paid. The difficulty and uncertainty of predicting these CERCs, obtaining indemnification or insurance, and banding together a sufficiently large number of farmers to generate a pool of potential CERCs large enough to overcome substantial baseline transactional costs and uncertainty whether the CERCs generated would meet current, pending or future regulatory requirements operated to drive up the costs incurred by the potential CERC purchasers, drive down the price paid to the producers and generally make it difficult to establish and engage in a market for CERCs.

Existing natural resource-based methods to trade CERCs generally share a number of shortcomings. Typically, the contracts specify certain land management practices, but do not require a certain number of CERCs to be generated. The estimated CERC values are highly variable and minimized due to uncertainties caused by using general regional data to try to estimate CERCs and by high transactional costs. Without a reasonably accurate method of quantifying CERCs generated, it is difficult for all to place a fair value on the trade. Also, trades generally have been designed and instigated by a potential CERC purchaser, or an entity representing one, and not by the CERC producer, such as a farmer or landowner. Further, each trade must be individually designed by the CERC purchaser to be consistent with current and anticipated legislative requirements and to maximize the likelihood that CERCs will be generated. Competition is also limited by the requirement of projects large enough to achieve economies of scale. As a result, the price paid to CERC producers is driven down and the market for trading CERCs is limited.

In the absence of an accepted process to generate, quantify and standardize CERCs, especially CERCs generated or projected to be generated by carbon sequestration in land or plants, the market for such CERCs remains relatively primitive, inefficient and uncertain. The existing attempts to identify and trade CERCs suffer from difficulties in quantifying accrued and projected CERCs, high administrative costs in quantifying and indemnifying accrued and projected CERCs, and the lack of a market for individuals and individual entities to effectively engage in CERC trades. These problems particularly restrict the ability of an individual landowner, or groups of landowners, to efficiently generate, quantify, standardize, market and trade CERCs.

As such, a need exists for an improved method of generating, quantifying and standardizing CERCs, particularly so that a relatively smaller producer of CERCs, such as an individual landowner or groups of landowners, may be able to reliably and efficiently participate in a market for CERCs by generating and quantifying standardized CERCs by a method capable of adapting to meet a broad range of regulatory specifications.

BRIEF DESCRIPTION OF THE DRAWINGS

FIG. 10 is a table containing $CO_2$ mass partial derivative values for uncertainty calculations which may be used in the modules and methods of embodiments of the present invention.

FIG. 11 is another table $CO_2$ mass partial derivative values for uncertainty calculations which may be used in the modules and methods of embodiments of the present invention.

FIG. 12 is a table containing $SO_2$ mass partial derivative values for uncertainty calculations which may be used in the modules and methods of embodiments of the present invention.

FIG. 13 is another table containing $SO_2$ mass partial derivative values for uncertainty calculations which may be used in the modules and methods of embodiments of the present invention.

FIG. 14 is a table containing heat input mass partial derivative values for uncertainty calculations which may be used in the modules and methods of embodiments of the present invention.

FIG. 15 is another table containing heat input mass partial derivative values for uncertainty calculations which may be used in the modules and methods of embodiments of the present invention.

SUMMARY OF THE INVENTION

Figure 1:
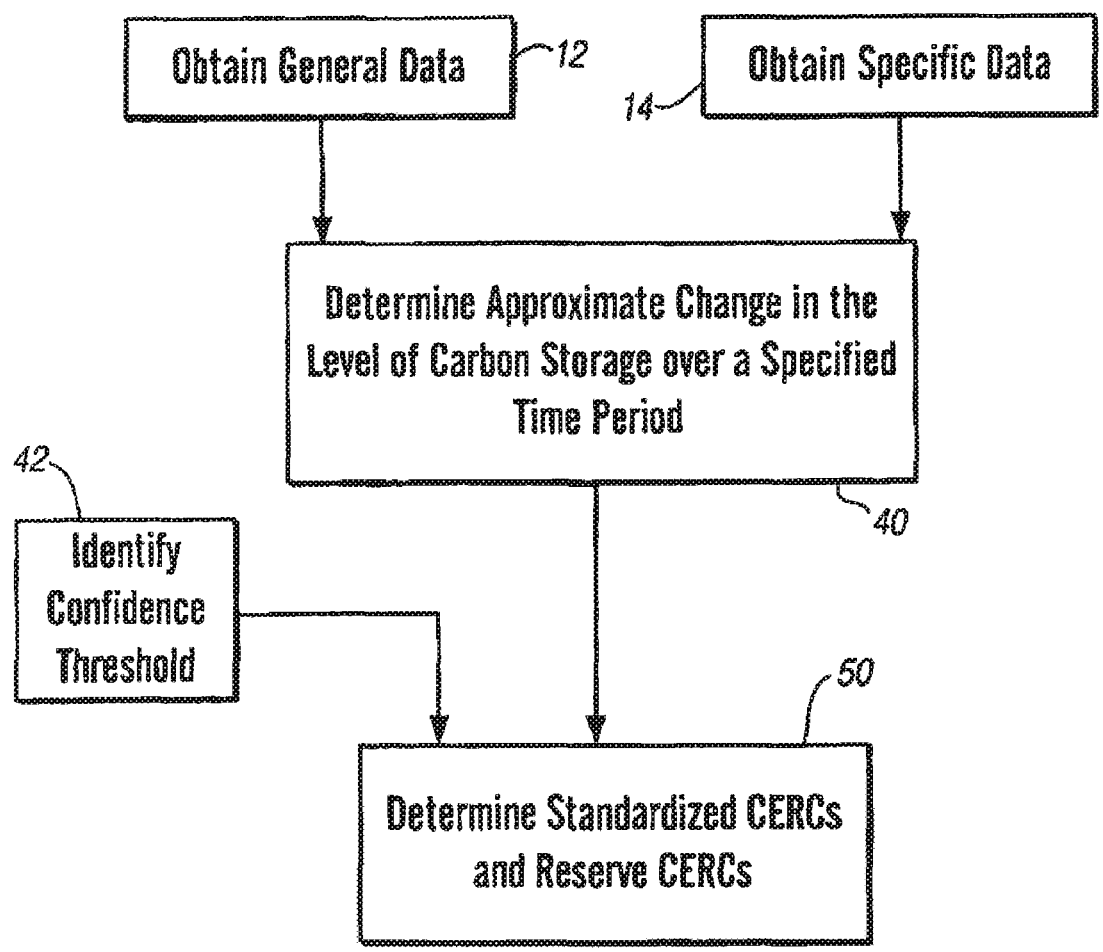
FIG. 1 is a flow chart depicting one embodiment of the invention to generate standardized carbon emission reduction credits and reserve carbon emission reduction credits.

This invention generally relates to a method and apparatus for determining standardized carbon emission reduction credits and, more particularly, to a method and apparatus for generating, quantifying and confirming standardized carbon emission reduction credits and reserve carbon emission reduction credits.

In general, there are six elements of a CERC: 1) a baseline of emissions of specific greenhouse gases as a result of business as usual activities; 2) additivity; 3) permanence; 4) leakage; 5) ownership; and 6) verification. The business as usual baseline generally refers to the level of greenhouse gas emissions from continuing current management practices in that particular industry. In the case of farmers, business as usual typically is defined as conventional tillage agriculture, but may be specifically determined for each land parcel based on the land management history. Further, the business as usual baseline may be defined as an average of a larger community, rather than a business as usual for an individual or a single entity.

The second element is additivity, which generally refers to human activity that causes a reduction in business as usual emissions. That is, the change between the level of greenhouse gas emissions under the business as usual baseline and the lower level of emissions must be caused by human intervention. In the case of farmers, this typically means changing land management away from the business as usual practice of conventional tillage agriculture. Even with crops removing carbon dioxide from the air, conventional tillage agriculture typically results in a net release of carbon dioxide into the air due to oxidation of carbon compounds contained in the soil. In general, as tillage intensity decreases, thereby decreasing the amount of soil exposed to the oxygen in ambient air, carbon turnover also decreases, resulting in a decrease in the net carbon dioxide emissions into the atmosphere. A change to minimum tillage, or to no tillage at all, typically results in less carbon dioxide emitted or even a net sequestration of atmospheric carbon. A change from cropland to grassland can result in the sequestration of substantial amounts of carbon dioxide in the form of organic carbon compounds that can accumulate in grassland soils. Human activity other than, or in addition to, changing land management away from conventional tillage agriculture may also be employed to cause a reduction in business as usual emissions.

The third element is permanence. The general objective of emissions trading is to reduce atmospheric concentrations of greenhouse gases to allow time to develop the technology to decrease emissions into the atmosphere directly from the source. In this case, permanence typically is defined as the storage of carbon dioxide in the form of biomass or soil organic carbon for a time period specified by regulation, typically twenty or thirty years. Generally, residence times for carbon removed from the atmosphere by forests can exceed decades, whereas soil carbon can have residence times that exceed hundreds to thousands of years.

The fourth element is absence of leakage, which generally means that the changed human activity intended to generate a CERC does not result in an undesirable increase in greenhouse gas emissions in any part of the biogeochemical cycle. In the case of carbon sequestration, CERCs are more valuable if the landowner can demonstrate that the changed human activity that resulted in generation of the CERCs does not result in increased emissions of other gases, such as nitrous oxide or methane, as compared to business as usual emissions.

Another element to maximize the value of a CERC is documentation of ownership. That is, the entity offering to trade or sell a CERC must demonstrate that it is the owner of rights to the CERC. Although this typically will be the landowner-operator in the case of soil carbon sequestration, other scenarios are possible, e.g., where by agreement or operation of law another has rights to use all or part of the land.

Yet another requirement is verification, which generally refers to the ability of a third party to verify the generation of the CERC through an approved accounting process. Verification typically requires that the process employed be transparent, i.e., the process is documented so that a third party may review, analyze, understand and replicate it. For example, verification may include audits of data to ensure accuracy. The CERC value generally will be maximized where the process employed to establish the CERC directly corresponds to the method of verification.

Direct measurement of the absolute amount of carbon sequestered in a given parcel of land is difficult and expensive. Further, the absolute amount of carbon in a specific soil sample may be highly variable for samples collected at individual points within the parcel of land, due to the mean residence time of organic matter in soils often being on the order of 1,000 years and due to soil characteristics often being quite spatially variable. Therefore, it may not be practical to obtain an accurate, precise, reproducible, cost effective direct measurement of the relatively small amount of carbon added to, or subtracted from, a land parcel over a period of several years to decades, the time periods required by current and pending legislative protocols.

This invention recognizes that, although the total amount of carbon in a specific soil sample may be quite variable, the incremental carbon stored as a result of specific land management practices over periods of decades is much less variable, particularly since most soils have been tilled in the past, at least in the United States and much of the industrialized world. This is because previously tilled soils contain levels of organic carbon that are much lower than their organic carbon saturation levels and therefore carbon storage over periods of decades is relatively insensitive to soil carbon variability.

This invention also recognizes that, to generate and quantify accrued and projected CERCs with reasonable accuracy, it is not necessary to measure the total organic content of the entire soil profile, or even the absolute amount of carbon added to, or subtracted from, the soil since 1990. Rather, this invention recognizes that standardized CERCs may be generated and quantified by estimating the incremental carbon stored in the soil over time, e.g., since 1990.

This invention further recognizes that carbon sequestration can be conceptualized as a national issue, which allows one to reconcile aggregate sequestration estimates with continental-scale carbon flux estimates. That is, by compiling CERCs from a number of landowners, one may more readily generate and quantify accrued and future CERCs with reasonable accuracy for the compilation than for a single or smaller group of landowners. Therefore, the allocation of CERCs from the compilation to individual land parcels need not be precisely accurate. However, to be fair to the individual landowner, the quantification system used should be transparent, reproducible, traceable and verifiable.

DETAILED DESCRIPTION OF PREFERRED EMBODIMENTS

One embodiment of the invention is directed to generating and quantifying standardized CERCs for a parcel of land through the use of general data for a given region encompassing the parcel of land by utilizing a carbon sequestration model and an uncertainty analysis. That is, it would not be necessary to have detailed, long term site-specific data for a parcel of land. Preferably, the general data for the region dates back as far as possible, more preferably back to approximately 1900 and the region is as small a geographic region as possible, such as a county in the United States. If available, site-specific data also may be used. More preferably, site-specific data from 1990 to date is used, along with the general data, to determine the standardized CERCs and reserve CERCs through a carbon sequestration model and uncertainty analysis.

Figure 3:
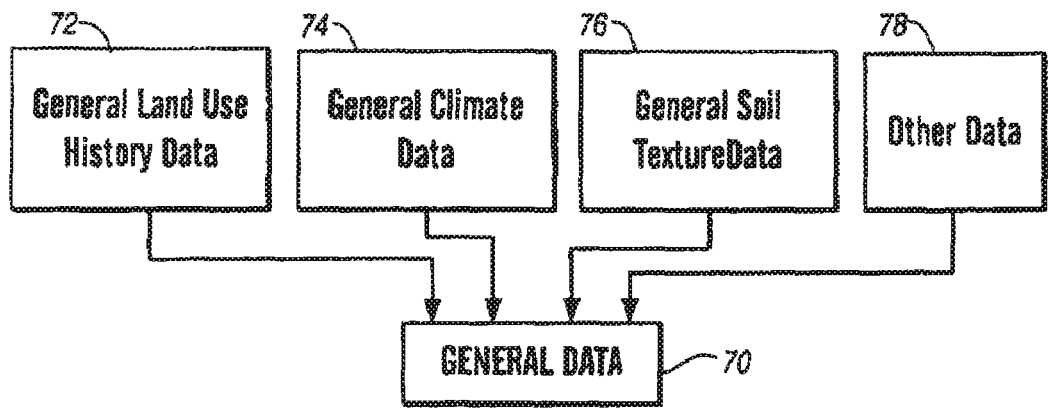
FIG. 3 is a flow chart depicting data components of site-specific data used to generate standardized carbon emission reduction credits and reserve carbon emission reduction credits of one embodiment of the invention.
Figure 4:
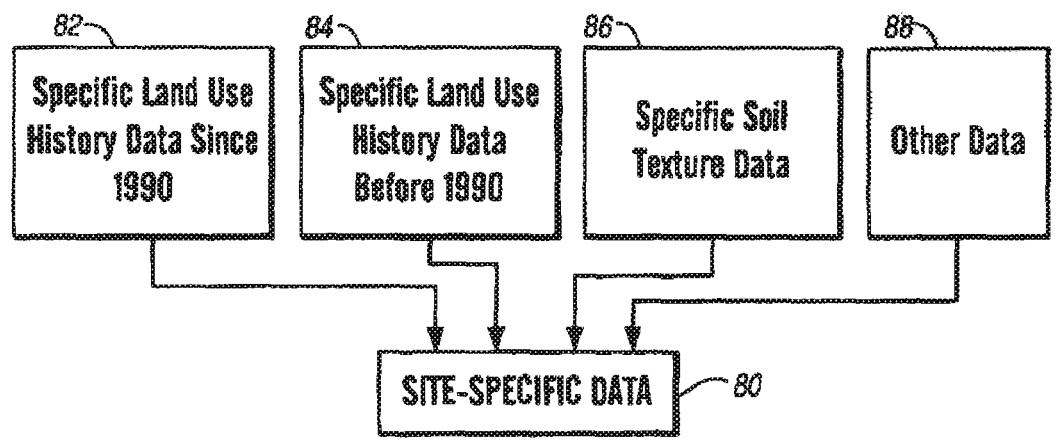
FIG. 4 is a flow chart depicting data components of general data used to generate standardized carbon emission reduction credits and reserve carbon emission reduction credits of one embodiment of the invention.

Referring to FIG. 1, one embodiment of the invention is depicted by a flow chart showing a method of generating standardized CERCs and reserve CERCs. General data is obtained 12, preferably from a database containing geographically referenced data relevant to carbon sequestration in soil. As shown in FIG. 3, such general data 70 may include one or more of general land use history data 72, general climate data 74, general soil texture data 76 and other data 78. Site-specific data 14 preferably also is obtained, more preferably from the landowner or other rights holder to the parcel of land. As shown in FIG. 4, site specific data 80 may include one or more of recent specific land use history data 82, preferably since 1990 or other year from which standardized CERCs are desired to be generated, less recent specific land use history data, preferably from before 1990 or other year from which standardized CERCs are desired to be generated, specific soil texture data 86 and other data 88. General data 12, preferably with at least some site-specific data 14, are used to determine the approximate change in the level of carbon storage in a media over a specified time period 40 through the application of a carbon sequestration model. A confidence threshold is identified 42 and the standardized CERCs and reserve CERCs are determined 50 through the application of an uncertainty analysis. The method can be employed to generate standardized CERCs and reserve CERCs accrued over a specific time period, such as from 1990 to date, and/or project standardized CERCs and reserve CERCs based on projecting certain general data and site-specific data for a specified time period.

Figure 2:
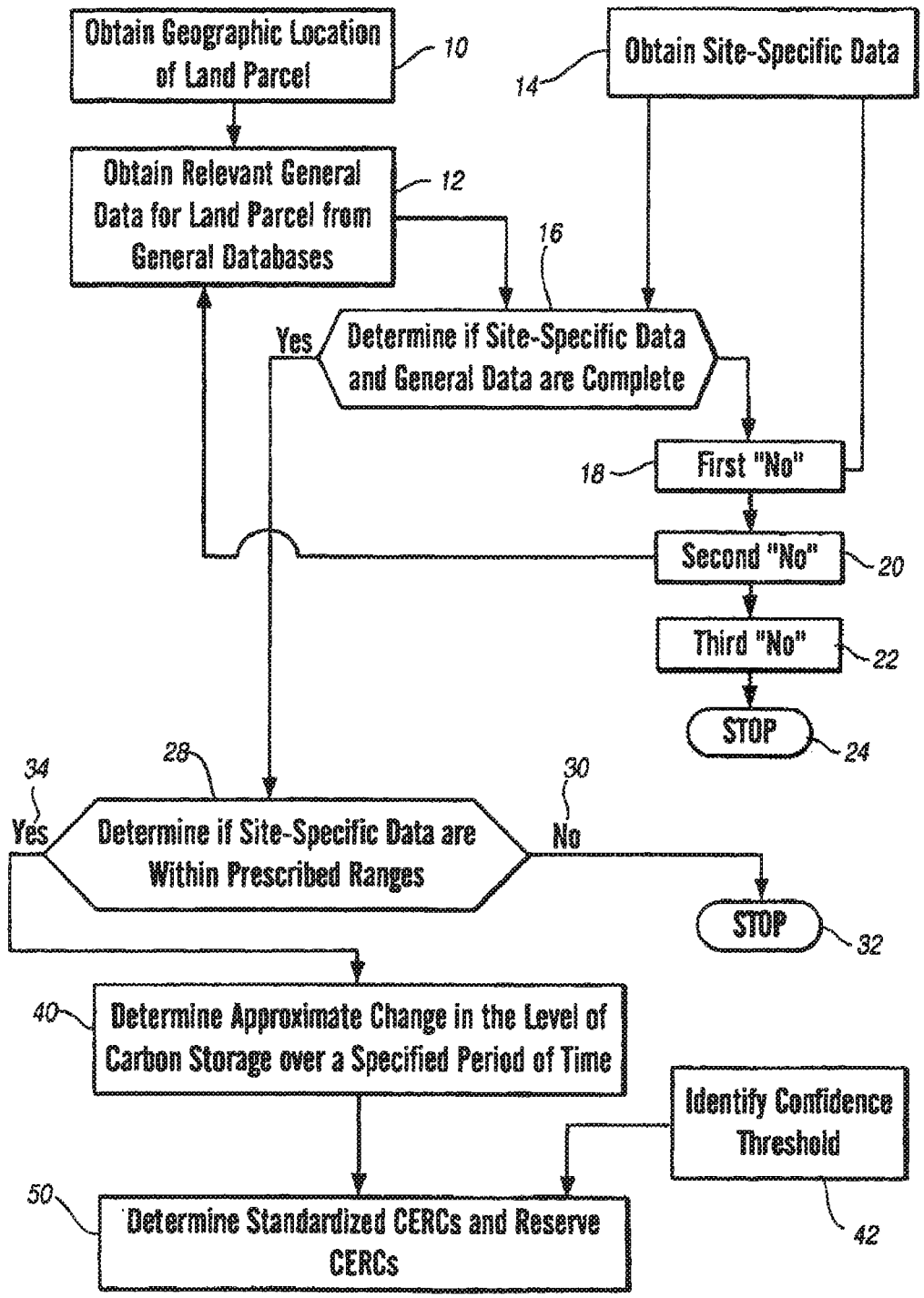
FIG. 2 is a flow chart depicting another embodiment of the invention to generate standardized carbon emission reduction credits and reserve carbon emission reduction credits.

Alternatively, as shown in FIG. 2, the geographic location of the land parcel is obtained 10 and used to obtain relevant general data for that land parcel from data stored in a database containing geographically referenced data relevant to carbon sequestration 12.

Also as shown in FIG. 2, the general data and/or the site-specific data alternatively may be tested. One such test 16 may be to determine if the general data and the site-specific data is sufficiently complete to allow the method to generate standardized CERCs. A first negative response 18 preferably initiates a request to obtain additional site-specific data 14. A second negative response 20 preferably initiates a request to obtain additional relevant general data for the land parcel from the general database 12. A third negative response 22 preferably initiates a stop command 24. A positive response 26 allows the method to continue.

Another test 28 that may be conducted is to determine whether site-specific data are within prescribed ranges or values of possible responses. A negative response 30 preferably initiates a stop command 32. A positive response 34 allows the method to continue.

In another embodiment of the invention, a combination of elements can provide an integrated system to generate and quantify standardized CERCs. These elements can include a systematic approach for gathering and managing data, a modeling component for estimating CERCs based on available information, a scenario module to help landowners develop best management strategies for generating CERCs, a system to quantify the uncertainty and risk, and strategies for auditing and verifying data inputs that are consistent with current, pending and future greenhouse gas emissions legislation.

Yet another embodiment of the invention, a method is employed 1) to generate and quantify standardized CERCs that have accrued over a specific time period, such as from 1990 to the present date, and/or 2) to generate and quantify standardized CERCs that are projected to exist from the present date to a specific date in the future, based on land management practices or other commitments by the landowner, and/or 3) to advise a landowner of standardized CERCs that would be projected to exist based on commitments to one or more land management practices.

International greenhouse gas emission reduction protocols, such as the Kyoto Protocol, typically specify 1990 as the base year upon which to establish greenhouse gas emission reductions. Therefore, CERCs can be generated by demonstrating human-caused incremental carbon storage since 1990 compared to business as usual emissions. To estimate the incremental amount of carbon stored in the soil since 1990 for a specific land parcel, it is preferred to determine the available carbon reservoir, if any, of the soil from the identified land parcel. That is, it is preferred to determine whether the land parcel contains essentially all the carbon it is capable of containing, or whether the soil has a capacity to store additional carbon. If the carbon reservoir is not full, the land parcel may be amenable to land management practices to increase carbon storage and thereby demonstrate the element of additivity. The soil carbon reservoir need not be determined precisely, since the sequestration rate of carbon into soil is relatively independent of how much carbon is in the reservoir, as long as it is not full.

Several different carbon models are available to determine the available carbon reservoir, if any, within the soil and/or vegetation located on a particular land parcel. The type and level of detail of the required data are dependent on the carbon model employed, although typically such data may be characterized as general and site-specific. General data may include any data that has an impact on sequestration of atmospheric carbon and that is not necessarily specific to a particular land parcel, and preferably includes crop behavior, soil response, carbon behavior and calibration, as well as typical soil texture and land use referenced by geographic region or location. Site-specific data may include any data about the specific geographic site in question that has an impact on sequestration of atmospheric carbon, and preferably includes climate data, soil texture and land use history directed to the specific parcel of land.

For example, crop behavior refers to the impact of particular crops in increasing carbon storage in soil, which is readily available for typical crops, such as corn or soybeans. Climate data may include historical records of temperatures, precipitation, winds, etc., which is widely available in the United States through a variety of sources, such as the National Weather Service. The soil texture for a given geographic location can be determined in a number of ways, such as testing or public records, preferably by reference to NRCS, SSURGO data and/or STATSGO data.

Land use history generally refers to the land management practices employed over a period of years. Land use history data may be characterized as general land use history data and site-specific land use history data. General land use history data may be typical and average data for a geographic area encompassing the parcel of land, such as a nation, state, or preferably a county in the United States, and may include typical practices in the given geographic area, such as types of crops, tillage methods, fertilization, irrigation, grazing, planting and harvesting practices, and other practices affecting carbon sequestration. General land use history data may be available from national, regional, state, county and local sources, such as the U.S. Department of Agriculture and other federal agencies, individual state agencies and county extension offices and other local sources.

Land use history data may also be characterized as site-specific, which may include the actual land management practices employed on that land parcel during specified time periods, e.g., types of crops, tillage methods, fertilization, irrigation, grazing, planting and harvesting practices, and other practices affecting carbon sequestration. Preferably, specific land use history data for a land parcel can be obtained from information provided by the landowner or, alternatively, from other historical sources, such as government and historical records, or from both sources.

Preferably, a numerical model known as CSU Century, developed at Colorado State University, is employed. CSU Century is a well accepted numerical modeling computer program designed to generally predict how much carbon is sequestrated in various ecosystems over time. It was developed originally for grassland ecosystems, but has been found to be accurate for a wide range of ecosystems, ranging from the tropics of Africa to the Boreal regions of Canada. The CSU Century program generally requires extensive data regarding land use history, climate and soil texture, among other things.

As noted, the invention recognizes that standardized CERCs may be generated and quantified without calculating the absolute amount of carbon in the soil profile. Rather, the incremental carbon stored in the soil over time, and especially since 1990, may be approximated. This recognition greatly simplifies the analysis by allowing the use of less detailed and less complete data, particularly as the time period in question lengthens.

For example, when used to determine the total organic carbon reservoir of an area of land, the CSU Century program generally requires extensive and detailed land use history data over relatively long periods of time, including, among other things, the types of crop, the amounts of fertilizer and when applied, the types and frequency of cultivation, irrigation amounts and when applied, organic matter additions, grazing systems, planting and harvesting dates, and the types of harvest. These data are gathered together as schedule files for use in the Century program. The present invention simplifies the use of carbon sequestration models by, among other things, recognizing that relevant data from greater than 100 years ago may be relatively general and incomplete, data from approximately 1900 to 1990 preferably may be more specific and more complete than the older data, but need not necessarily be so, and data from 1990 to date preferably may be relatively even more specific and even more complete.

Preferably, general data regarding typical land management practices, climate and soil texture from approximately 1900 through at least 1990 can be collected from national, regional, state, county and/or other local public records, compiled and converted into detailed schedule files to create a general database. Preferably, the general database contains general data relevant to carbon sequestration and referenced by geographic information, such as by nation, state, country, longitude, latitude and/or other geographic reference. General data from 1990 to date also may be collected and compiled in the database.

The data in the general database more preferably can be compiled independently of individual landowner input or data and can generate a generic land use history for selected regions or locales. Such a generic land use history may have several uses. For example, generic land use histories can be used to define the ranges of plausible responses that are likely to be given by individual landowners within the geographic region. If landowner responses fall outside of these prescribed ranges, the response can be targeted for verification and auditing. Also, if site-specific data are unavailable or incomplete for a given landowner in that geographic area, general data may be used to substitute for or supplement site-specific data. A generic land use history based on general data for a particular region alternatively could be used for all of the land use history for a given land parcel within the region.

Preferably, the general database may provide much of the data required by the carbon sequestration model to determine the available carbon reservoir, if any, and to generate and quantify standardized CERCs, both accrued and future. It is particularly advantageous for the general database to contain sufficient data for the time period prior to 1990 for the carbon sequestration model to determine the available carbon reservoir, if any. With public records providing the data for the time period prior to 1990, verification of resulting CERCs is simplified and expedited and the documentation requirements placed on the landowner are significantly reduced, thereby reducing barriers for the landowner to engage in the CERC market and increasing the value of such engagement by reducing uncertainty.

Site-specific data, preferably from the landowner, also may be used for certain land use history since 1990, such as the types of crops, tillage, fertilizer, irrigation, organic matter and grazing since 1990. More preferably, the landowner can provide and document detailed site-specific data, such as the crop type, the type and time periods of tillage, the type, amount and time periods of fertilization, the type, amount and time periods of irrigation, the type, amount and time periods of organic matter additions and the type and number of animals grazing, if any. Most preferably, the available information is provided for relatively short time intervals, such as by month. The landowner provided site-specific data also may be converted to detailed schedule files and stored in a data base.

To supplement or substitute for missing, incomplete or less accurate site-specific data, general data may be used, preferably from the general database. As the site-specific data are less accurate and/or less complete, the resulting CERCs will have a greater uncertainty, resulting in fewer standardized CERCs being generated and quantified, as described below. Similarly, if certain site-specific data are not available from either public records or the landowner, general data may be substituted, at the cost of increasing the fraction of CERCs held in the reserve pool.

Inputting the general data and available site-specific data into the carbon sequestration model can provide an initial analysis of whether or not the carbon reservoir of a land parcel is full and define the net carbon flux for the business as usual scenario. If this analysis shows the possibility of additivity, then more specific and more recent data from 1990 may be used, if available, to determine incremental carbon storage for the period beginning in 1990 to the year of the analysis.

Similarly, the incremental carbon to be stored in the soil into future years may be projected, preferably based on the data already inputted, e.g., based on continuing current land use practices previously input and based on entering variables not dependent on landowner behavior, such as long term weather projections. Also, the potential for storing incremental carbon into the future also may be projected by changing at least one variable that is dependent on landowner behavior, e.g., land use practices, particularly those associated with increasing carbon storage in soils.

In a preferred embodiment, future carbon storage can be determined based on the landowner providing alternative land use management practices that could be employed into the future. The relative carbon sequestration potential for each potential land use management practice can be determined by the methods described above and reported to the landowner. More preferably, the carbon sequestration potential for each alternative land use management practice can be determined through the use of a look-up table consisting of a series of scenarios that have been pre-analyzed for regionally important variables. Even more preferably, the landowner may provide such alternative land use management practices through an interactive media that is capable of identifying certain variables, offering alternatives to one or more variables, generating and quantifying standardized future CERCs based on the selected alternatives and providing a report. The results preferably can be used by the landowner to assess variables to maximize the generation of CERCs and their value.

After the quantity of accrued and projected incremental carbon storage is determined, the results may be subjected to an analysis to check the data and the modeling. Preferably, the data provided by the individual CERC producer can be analyzed to verify that the data is within expected or prescribed ranges. Data found to be outside of such ranges can be flagged for independent verification and auditing.

The results also may be subjected to an analysis of uncertainty. This invention recognizes that the use of an uncertainty analysis can allow the use of general data for input variables into carbon sequestration models to determine the approximate change in the level of carbon compounds in soil over specified time periods. The use of general data in such models is particularly advantageous for data for years dating back into time, such as prior to 1990 and back as far as 1900 or earlier, for which site-specific data may be difficult or impossible to document.

The uncertainty analysis allows one to quantify the relative level of uncertainty in the results of the sequestration model and express it as standardized CERCs and reserve CERCs, as explained in more detail below.

An uncertainty analysis generally performs a number of simulation runs in which certain key input variables are allowed to range across a distribution of reasonable values. The results for each simulation then can be compiled and compared to determine the potential range of variation in carbon sequestration due to uncertainties in the input data. For example, an uncertainty analysis generally takes a given range of the input data and determines a range of possible results.

Preferably a Monte Carlo uncertainty analysis is employed, although a variety of other methods may be used. In a Monte Carlo uncertainty analysis, input variables that affect the result are randomly assigned values that follow a particular distribution, such as Gaussian, although other distributions may be used, if more appropriate. A number of simulations are conducted, each time again randomly assigning values to the key input variables. From the results accumulated from the simulations, the actual distribution U of values arising from the uncertainty in the key variables can be determined. If, for example, the actual distribution U is Gaussian, a mean value X and a standard deviation S may be determined using standard statistical equations. X and S define a distribution of possible CERC values for that land parcel. According to the properties of a Gaussian distribution, X is considered the most probable value and S defines a spread of possible values around the mean.

To quantify the number of standardized CERCs for a land parcel, a confidence threshold C may be defined in terms of the standard deviation of the calculated Monte Carlo distribution and expressed as a probability, $P=f(C)$, that the standardized CERCs will actually be stored in the soil. For example, if C is chosen to equal 0.95, then for a normal two-tailed Gaussian distribution, $f(0.95)=2S$ and the standardized CERCs would be equal to X-2S, and the reserve CERCs would be equal to 2S. In that example, one may characterize the standardized CERC in terms of being 95% confident that one metric ton of carbon is or will be actually stored in the soil. The actual threshold C used in commercial practice may vary, e.g., for different applications, for different collections of CERC producers, for different potential CERC purchasers and other variables. The preferred threshold C is approximately 0.90 or higher.

One advantage of this approach is that the analysis may be immediately set up using standard Gaussian input distributions, but the expected distributions of input variables may be refined over time as more data becomes available, such that the distribution of random values may mimic more closely the distribution of values likely to actually occur.

In general, as the number of Monte Carlo simulations increases, the accuracy of the results increases. Preferably, a complete uncertainty analysis is conducted on each parcel of land to best characterize the uncertainty associated with that land parcel. Preferably, approximately 100 to approximately 1,000 small runs are conducted. Test results have shown that 800-1,000 simulation runs produce a stable distribution of results. Additional or different simulations can be run to further improve the accuracy of the results, particularly as computing technology continues to improve. However, current system constraints may limit the number of simulation runs per land parcel and other factors may reduce the number of simulation runs that can be conducted. Additional test results have shown that approximately 200 simulation runs for each land parcel can produce an uncertainty distribution similar to the results of 1,000 simulation runs and thereby provide a reasonable estimate of uncertainty for individual land parcels. This preferred embodiment of approximately 200 simulation runs currently provides a reasonable balance between accuracy and practicality, while still providing a customized uncertainty analysis for each parcel of land.

In addition to the uncertainty analysis for each parcel of land, additional uncertainty analyses may be conducted to improve the reliability of the results and to better understand the uncertainty distribution U, among other things. Again, a Monte Carlo uncertainty analysis is preferred, wherein the results for one or more of the land parcels may be subjected to a similar analysis, but with a greater number of simulations, more preferably approximately 1,000 simulation runs. A greater number of simulations, conducted repeatedly for many landowners, can provide information on the form of U and assist in choosing the preferred function to calculate $P=f(C)$, all as would be recognized by one skilled in the art.

In addition, these additional simulation results may be compared with the results for 200 simulation runs. From each 1,000 simulation runs, subsets of 200 simulation runs may be extracted to determine and compare their statistical means and standard deviations to those of the 1,000 simulation runs. This data preferably may be used to determine the amounts by which the results of a 200 simulation run set differs from the results of a 1,000 simulation run. For example, if a 200 simulation run subset is found to typically underestimate the uncertainty range by 2%, that variation may be added to the uncertainty calculated for each land parcel.

Land parcels may be randomly selected for these 1,000 simulation runs, although preferably each land parcel is selected. Using current technology on a single workstation, approximately 10 sets of 1,000 simulation runs can be run in one day. Depending on the number of landowner registrations received per day, this may result in as few as several percent or as many as 100% of landowners could be selected for full analysis. Additional workstations may be dedicated to running these simulation runs, if necessary or desirable. Preferably, a minimum of approximately 5% of all land parcels would be subjected to these 1,000 simulation runs.

Additional audits may be conducted. For example, selected input data may be compared with satellite imagery or Farm Service Agency records to independently confirm land use histories. For example, a landowner's assertion that corn had been planted on a land parcel during a specific year dating back to approximately 1980 may be verified by selected landsat images. Candidates for this type of auditing preferably would be identified by specific indicators, such as certain landowner responses falling outside of expected ranges, e.g., as established by the general database. Some candidates also could be selected at random.

Although carbon sequestration is sensitive to many variables, those variables have been shown to be definable fairly accurately. In tests conducted according to the invention, data for sample parcels of land in South Dakota generally have resulted in an uncertainty of approximately 5% for most runs conducted on the key variable of soil texture. Other uncertainties, such as future climatic variables, can be evaluated as part of the uncertainty analysis and generally will tend to be additive.

From the results of the uncertainty analysis, a fraction of the CERCs generated may be standardized and identified as available for trade, with the remaining CERCs placed in reserve. For example, if the total uncertainty calculated were approximately 5%, preferably approximately 95% of the CERCs generated would be certified as standardized CERCs available for trade and the remaining approximately 5% would be placed into a reserve pool. In that example, if 100 CERCs had been calculated, then up to 95 standardized CERCs could be certified for trade and 5 CERCs would be included in the reserve pool. In the future, as data and carbon sequestration certification technology improves, the reserve pool preferably may be reduced. Conversely, if future climate change or other factors caused the uncertainty to increase, the reserve pool preferably may be increased. The actual percentage variation is currently being determined by uncertain analysis and may be greater than the above example of 5%. Through this process, each CERC certified and traded may be standardized, such that it is equal in value regardless of where it was generated. That is, a standardized CERC generated and quantified by the present invention may be a tradable commodity.

The CERCs can then be compiled for trade, preferably in an open market to a variety of potential CERC purchasers. Preferably, additional standardized CERCs from one or more other CERC producers, from a variety of sources and geographic locations, can be additively pooled to increase the size and value of the compilation. Through such a system of the present invention, CERC generators and CERC purchasers can more readily communicate and evaluate the availability of CERCs of demonstrated quality and quantity, resulting in a lower risk to the CERC purchaser, higher price to the CERC generator and a more equitable result for all involved.

The quantity of incremental carbon storage that was initially calculated, but determined to not meet the established standards for a CERC certified for trade, may be identified and retained in a reserve or indemnification pool. Preferably, these results and the underlying data are maintained and combined in the indemnification pool with similar results and data from other landowners. This process preferably may reduce or eliminate the need for CERC purchasers to buy relatively expensive insurance for protection against the carbon storage being less than expected.

The standardized CERCs, whether accrued or projected, also may be subjected to confirmation or testing. This invention recognizes that, by collecting and offering for trade a collection of CERCs generated by land use management of a number of landowners over a relatively larger geographic area, the aggregate reduction of business as usual greenhouse gas emissions need only be independently confirmed, e.g., by regulatory agencies. That is, the accuracy of CERC generation for an individual parcel of land within that aggregate generally would not be an issue to the CERC purchaser. Generally, as the land area increases, the testing for CERC generation becomes easier, more accurate and more cost efficient. For example, CERCs generated over a several hundred or several thousand square mile region are more readily susceptible to testing, such as by reconciling with ambient carbon dioxide concentrations and isotopic tracer techniques.

For the global CERC market, the potential CERC purchaser is concerned that the number of CERCs actually has been, or will be, generated to the satisfaction of the applicable governing bodies. Currently, this typically requires independent verification to determine that the method to generate and quantify the CERCs is transparent and repeatable. In the long run under current protocols, the aggregate carbon balance of an entire nation would be validated based on independent assessment technology. In the case of carbon sequestration, the validation would likely be based on the results of intensive long term research at selected research sites and it is unlikely that each parcel of land, or a random selection of parcels of land, would be tested. Currently such a process would be difficult scientifically and not feasible economically for each CERC trade. However, additional technological and scientific improvements could change those dynamics to allow individual or random verification. Such advances can be readily incorporated to generate and quantify standardized CERCs according to the present invention.

In another embodiment of the invention, standardized CERCs may be generated and quantified by identifying categories of information to determine the relative level of carbon sequestration, obtaining available information, estimating the change in carbon storage in a selected media since 1990, estimating the change in carbon storage in selected media into the future depending on certain input variables, conducting an uncertainty analysis and quantifying standardized CERCs.

In a preferred embodiment of the invention, individual CERC producers can register and provide site-specific data regarding carbon sequestration, the producer provided site-specific data may be combined with general data from a general database of previously acquired information, and input into a carbon sequestration model, incremental carbon storage can be calculated that has been previously generated and/or that is projected to be generated, the calculated result can be subjected to an uncertainty analysis to quantify the number of CERCs that meet an established standard of certainty, the standardized CERCs can be collected into a primary pool with standardized CERCs from other landowners, other incremental carbon storage can be collected into a reserve pool with similar results from other landowners, and the primary pool can be marketed to potential CERC purchasers. As data and/or analyses is improved or updated, incremental carbon storage from the reserve pool may be released to the primary pool. This invention allows an individual landowner, or a group of landowners, to generate, quantify, certify, market and trade standardized CERCs, both accrued and projected.

For the example of an individual or individual entity landowner, the landowner preferably may identify the parcel of land and receive an advisory report that quantifies possible accrued and/or future standardized CERCs, based on the previously stored general data in the database. Alternatively, the landowner may be requested to provide available site-specific data in response to particular inquires regarding the land and land use history in order to generate a more customized advisory report. Preferably, the advisory report would include the number of accrued standardized CERCs determined to be available for trade and the quantity of reserve CERCs. Alternatively, the landowner can select to change one or more of the input variables regarding future land management practices and receive a report that includes projections of future standardized CERCs based on the one or more changed input variables. The landowner preferably may conduct multiple analyses to better assess the impact of certain land management practices on CERC generation.

In another embodiment of the invention, a method to generate and quantify standardized CERCs includes obtaining selected information from at least one landowner, obtaining selected information from a data base, inputting selected information from the landowner and from the data base into a carbon sequestration model to determine the approximate change in the level of carbon sequestered in the land parcel over a specified time period, conducting an uncertainty analysis on the results and providing a report to the landowner.

Information from a landowner preferably is obtained through an interface, which may be any media through which the landowner may identify the geographic location of the land at issue and optionally input other data, such as land use history data, relevant to carbon sequestration. For example, the interface may involve the landowner manually completing written forms, verbally responding to inquiries, forwarding other documentation or information, otherwise providing requested data or combinations thereof.

In a preferred embodiment, the interface comprises an automated inquiry and response system, allowing the landowner to input certain information in response to certain inquiries. For example, the interface preferably would request the landowner to identify the landowner, the parcel of land and other site-specific data relevant to carbon sequestration. More preferably, the results from the landowner interface are compared with a database containing general data, and optionally site-specific data, relevant to generating and quantifying standardized CERCs to identify missing, incomplete or mis-entered data and to request additional information.

The interface also preferably requests site-specific data regarding the land and land use history of that parcel of land, including the actual land use practices employed during specific time periods, e.g., types of crops, tillage, fertilizer, irrigation, etc., as described in more detail above. More preferably, detailed and documented site-specific data is requested on a monthly basis for each year dating back to at least 1990.

In a more preferred embodiment, the interface includes a website accessible to a potential CERC producer that facilitates the data input from the potential CERC producer. Additionally, the website preferably includes additional information and reference material, such as background information regarding carbon sequestration and the global CERC market, current news relevant to CERC markets, a description of the process employed to generate and quantify standardized CERCs and the indemnification pool, a compilation of statistics relating to CERCs, and a compilation of accrued and projected CERCs from other CERC producers.

The database may be any compilation of data relevant to sequestration of atmospheric greenhouse gases and preferably includes a compilation of geographically referenced information. Preferably, the database contains both site-specific data and general data that have an impact on sequestration of atmospheric greenhouse gases. As described above, site-specific data preferably includes climate, soil texture and land use history, among other things, and general data preferably includes crop behavior, soil response, carbon behavior and calibration, among other things. More preferably, the general data can be obtained from public records and placed in a format referenced or indexed by geographic location.

The site-specific data from the landowner and the relevant general data from the database can be input into a carbon sequestration modeling program to determine the available carbon reservoir, if any, in the particular parcel of land and the incremental carbon stored in the land since 1990. Again, preferably the CSU Century program is employed to make this determination.

The information from the landowner may be entered into the carbon sequestration modeling program in a variety of ways, preferably data input is automated and more preferably data input is automated through a website accessible to the landowner. In one embodiment of the invention, the system receives site-specific data from the landowner, determines or obtains the geographic location of the parcel of land, identifies the site-specific data, if any, and the general data relevant to that parcel of land stored in the database, identifies the business as usual scenario for the land parcel and submits the collected information to the carbon sequestration modeling program. The system may further compare the data inputted by the landowner with the data from the database to identify potential errors or mis-entries, which preferably may be flagged for independent review.

The carbon sequestration modeling program then can calculate the available carbon reservoir, the incremental carbon stored since 1990 and the incremental carbon projected to be stored for a specified time period into the future, based on continuing the current land management practices and projecting other variables not dependent on the landowner, all as described above. The results can be subjected to an uncertainty analysis, preferably a Monte Carlo uncertainty analysis, again as described above. Accrued and projected standardized CERCs can be calculated and compiled, with other incremental carbon storage being quantified and held in a reserve pool.

The results of the analysis can be communicated to the landowner, preferably in a report and more preferably in a report directly through the interface. Preferably, the system can allow the landowner an opportunity to run the analysis multiple times for future scenarios, with the landowner or another selectively changing one or more of the variables, in order to determine the impact of the change on the generation of standardized CERCs. For example, the landowner may desire to analyze the impact of changing the type of crops planted, the amount of fertilizer used, the frequency of irrigation, the level of tillage, the time of harvest, etc. The system allows the farmer to input any variable, or combination of variables, run the analysis and receive a report quantifying projected standardized CERCs. More preferably, the system identifies the variables that the landowner is able to change, identifies multiple choices for that variable and provides a mechanism for the landowner to select one or more of the choices.

In a more preferred embodiment, the system comprises a computer interface with the landowner, in which the landowner is requested to input requested information regarding the location of the parcel of land and land management practices employed on an annual basis since at least as early as 1990. More preferably, the information is requested in the form of multiple choice responses to particular inquires of land management practices. The system can take the information inputted from the landowner, identify and obtain relevant information from the database, submit the landowner and database information into a carbon sequestration modeling program, submit the results to an uncertainty analysis program, calculate accrued and projected standardized CERCs available for trade, as well as accrued and projected reserve CERCs, and generate a report for the landowner.

In an even more preferred embodiment, the landowner can input requested site-specific data via a website. The inputted data can be electronically transferred, along with relevant data retrieved from the electronically stored database containing the other site-specific data, if available, and general data relevant to that land parcel, to a carbon sequestration modeling program and to an uncertainty analysis program. From the results, standardized CERCs can be quantified, whether accrued or projected, and placed in a compilation of other standardized CERCs from other landowners. Results that do not meet the standards for a standardized CERC are placed in a compilation of other similar results and held as a reserve or indemnification pool. The compilation of standardized CERCs can be offered for trade on the open market.

More specifically, a more preferred embodiment of the invention comprises linkages between at least four components: 1) a website to obtain information from, and disseminate information to, one or more landowners; 2) a database structure to store collected information from the one or more landowners; 3) a database structure, such as a general database, to store collected information from other sources relevant to carbon sequestration; and 4) one or more data processors adapted to run a carbon sequestration modeling program and/or an uncertainty analysis program. The linkages allow information to be passed between the components, and allow that actions in one component, such as the submission of a request from the website to "quantify the standardized CERCs," initiate a sequence of actions whereby each component performs its designated task in its designated order to produce the desired result.

In the more preferred embodiment, the linkages operate automatically through a collection of computer programs, scripts and daemons, which together pass the needed information between the components and initiate the desired actions. For example, when the landowner submits a request to quantify the standardized CERCs, the database transfers the landowner's input data in a specific format to a specific directory on the computer running the carbon sequestration model. A daemon in that computer watches for information to appear and, when finding data in the input directory, initiates a master script program. The master script program calls a geographic information system routine to process the site location of the land parcel and obtain stored values in the database for general data, such as soil texture, climate and general land use history. These obtained values are placed in a data directory and control is returned to the master script. The master script then calls a set of Perl scripts which parse the appropriately formatted input files required by the carbon sequestration model. The master script calls the carbon sequestration model to perform its program and then the uncertainty analysis program to perform its program. The results are placed into a special output directory in specifically formatted files and the master script deletes the input files to prevent the initiation of another run. A different daemon watches for output files to appear and, when such output files are found, it calls a script to parse and interpret the results and a final report file containing the standardized CERCs and uncertainty is produced. Another daemon on the database system watches for this output file, transfers the results into the database and notifies the landowner by an appropriate method that the results are completed and may be viewed, e.g., on the website.

Another embodiment of the invention comprises an apparatus to generate and quantify standardized CERCs, which may include an interface with the landowner, a data structure adapted to store data relevant to carbon sequestration, such as land use history, soil texture and climate data, a data processor adapted to run a carbon sequestration modeling program, a data processor adapted to run an uncertainty analysis program and a mechanism to generate and provide a report to the landowner. The apparatus preferably is designed to allow individual landowners, or groups of landowners, to input requested information and receive reports quantifying accrued and projected standardized CERCs, as well as CERCs to be held in reserve.

Figure 5:
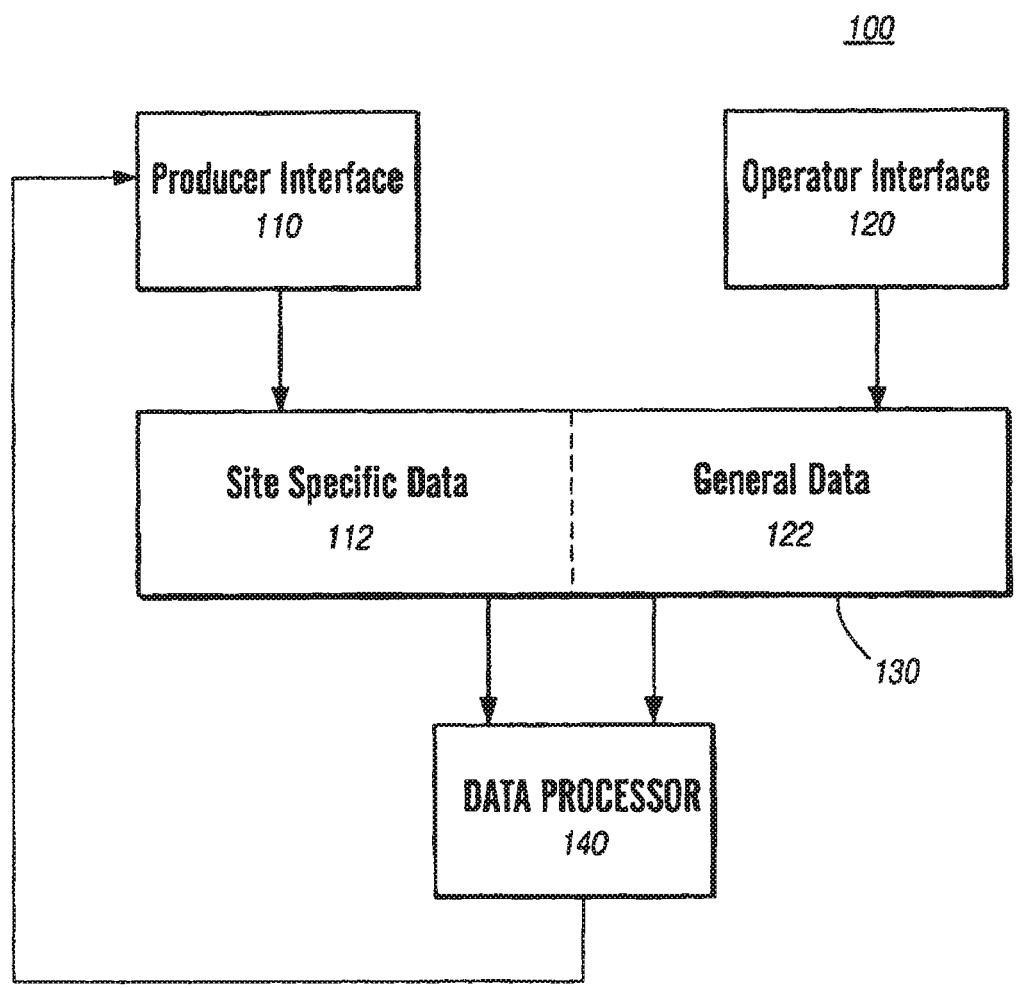
FIG. 5 depicts an apparatus of the present invention to generate standardized carbon emission reduction credits.

Referring now to FIG. 5, an apparatus 100 comprises a producer interface 110, an operator interface 120, a data structure 130 and a data processor 140. The configuration of components shown in FIG. 5 is a high level view of a computing system suitable for implementing one or more embodiments of the present invention. As one skilled in the relevant art of computing technologies will recognize, each of these components may be implemented using a variety of technologies and mythologies without departing from or degrading the novelty and usefulness of the present invention. Indeed it is contemplated that the present invention has broad applicability over multiple fields of endeavors and that it can be implemented using numerous types of computing technologies.

Accordingly, one skilled in the relevant art will recognize that the data processor 140 of FIG. 5 may take many forms and that the present invention may be implemented on a conventional or general-purpose computer system, such as a personal computer (PC), a laptop computer, a notebook computer, a handheld or pocket computer, and/or a server computer. These systems may generally include a central processing unit(s) (CPU) or processor(s) coupled to a random-access memory (RAM), a read-only memory (ROM), a keyboard, a printer or similar output device, a pointing device, a display or video adapter connected to a display device, a removable (mass) storage device (e.g., floppy disk, CD-ROM, CD-R, CD-RW, DVD, or the like), a fixed (mass) storage device (e.g., hard disk), a communication (COMM) port(s) or interface(s), a modem, and a network interface card (NIC) or controller (e.g., Ethernet).

In basic operation, program logic (including that which implements methodology of the present invention described herein) is loaded from the removable storage or fixed storage into the main (RAM) memory, for execution by the CPU. During operation of the program logic, the system accepts user input from a producer or operator interface 110, 120 such as a keyboard and/or pointing device. The keyboard or a similar device permits selection of application programs, entry of input or data, and selection and manipulation of individual data objects displayed on the screen or display device. Likewise, the pointing device, such as a mouse, track ball, pen device, or the like, permits selection and manipulation of objects on the display device. In this manner, these input devices support manual user input for any process running on the system.

The computer system generally shown in FIG. 5 displays text and/or graphic images and other data on the display device. The video adapter, which is interposed between the display and a system's bus, drives the display device. The video adapter, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system, may be obtained from the printer, or other output device. The system itself may also communicate with other devices (e.g., other computers) via the network interface card (NIC) connected to a network (e.g., Ethernet network, Bluetooth wireless network, or the like), and/or modem (e.g., 56K baud, ISDN, DSL, or cable modem)

Networks also include mainframe computers or servers, such as a gateway computer or application server (which may access a data repository within the data structure 130). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

Those skilled in the art will appreciate that the gateway computer may be located a great geographic distance from the network, and similarly, the devices may be located a substantial distance from the networks. For example, the network may be located in California, while the gateway may be located in Texas, and one or more of the devices may be located in New York. The devices may connect to the wireless network using a networking protocol such as the Transmission Control Protocol/Internet Protocol ("TCP/IP") over a number of alternative connection media, such as cellular phone, radio frequency networks, satellite networks, etc. Further, the network and wireless network may connect to one or more other networks (not shown), in an analogous manner.

The present invention may also be implemented using a wireline connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. A remote server, similarly, can be one of any number of different types of computers which have processing and communication capabilities. These techniques are well known in the art and the hardware devices and software which enable their use are readily available.

Preferably, the producer interface 110 of the present invention is adapted to receive data input by a potential CERC producer, more preferably in response to particular inquiries regarding the geographic location and size of the land parcel and its land use history. The producer interface 110 also preferably is adapted to receive a report from the data processor 140 and provide it to the potential CERC producer. The operator interface 120 is adapted to receive data by an operator, preferably geographically referenced general data relating to factors having an impact on carbon sequestration, such as climate, soil texture and land use history.

While the transfer of data to the producer interface 110 or from the operator interface 120 may occur locally it is increasingly common for such data transfers to occur remotely using networks that are interconnected by internetworks (e.g., the Internet). The Internet is rapidly emerging as the preferred system for distributing and exchanging data. Data exchanges support applications including electronic commerce, broadcast and multicast messaging, videoconferencing, gaming, and the like.

The Internet is a collection of disparate computers and networks coupled together by a web of interconnections using standardized communications protocols. While most Internet access is currently performed using conventional personal computers and workstations, the variety of devices that access the Internet is growing quickly and is expected to continue to grow. It is expected that a variety of appliances and devices within offices, businesses, and households will support Internet connectivity in the coming years. A major segment of growth is in the area of lightweight computing appliances. Examples include wireless telephones, sensors, personal digital assistants (PDAs), digital music, and digital movies among other examples. These devices are characterized by little or no mass storage capability. In such devices there is a need to access external mass storage such as network storage devices to access information needed to perform their functions.

According to one embodiment of the present invention, the data structure 130 is adapted to receive and store data from the producer interface 110 and preferably also is adapted to receive and store data from the operator interface 120. Alternatively, a separate data structure (not shown) may be used to receive and store data from the operator interface 120. More preferably, the data structure 130 is adapted to receive and store site-specific data 112 from the producer interface 110 and general data 122 from the operator interface 120. As described above, the general data 122 preferably is geographically referenced.

Conventional close-coupling between the services that manage the data and the data store itself may restrict the accessibility of the data. To overcome this limitation, data management functions can be replicated across multiple servers that are coordinated and synchronized. Beyond varying functional requirements for data storage and access, it is contemplated that increasing political, security, legislative and availability criteria may influence where certain data is physically stored or across what borders it is transported. For example, politically sensitive data may not be permitted in some jurisdictions. These and other data structure 130 limitations are contemplated by the present invention and in no way restrict or diminish the usefulness or applicability of the present invention.

The data processor 140 is adapted to identify the appropriate data from the data structure 130, including the data from the producer interface 110 and the data from the operator interface 120. Preferably, the data processor 140 is adapted to use the input geographic location of the land parcel to identify and obtain geographically referenced general data 122 stored in the data structure 130. The data processor 140 is adapted to use the site-specific data 112 and the identified general data 122 to determine the approximate change in the level of carbon compounds stored in the defined media over a specified period of time, preferably through the operation of a carbon sequestration modeling program.

Preferably, the data processor 140 also is adapted to receive the results of this determination and the data on which they were based and conduct an uncertainty analysis, preferably a Monte Carlo uncertainty analysis, to quantify standardized CERCs and reserve CERCs. Alternatively, a separate data processor (not shown) may be used to conduct the uncertainty analysis. The data processor 140 also may be adapted to generate a report and provide the report to the potential CERC producer, more preferably through producer interface 110.

In a preferred embodiment, the present invention can be implemented in software. Software programming code which embodies the present invention is typically accessed by a microprocessor (also referred to herein as a processor generally) from long-term, persistent storage media of some type, such as a flash drive or hard drive. The software programming code may be embodied on any of a variety of known media for use with the previously described data processing system. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

In another embodiment of the invention, a system to generate, quantify, standardize, pool and trade carbon emission reduction credits is disclosed. This system includes a method and apparatus to obtain data and commitments from one or more potential CERC producer, combine the obtained data with data obtained from other sources, quantify accrued standardized CERCs, projected standardized CERCs, and remaining carbon emission reductions not included in the standardized CERCs and compile accrued and projected standardized CERCs for trade. Preferably, the compiled accrued and projected standardized CERCs are marketed for trade after a certain quantity of such standardized CERCs has been compiled.

Figure 6A:
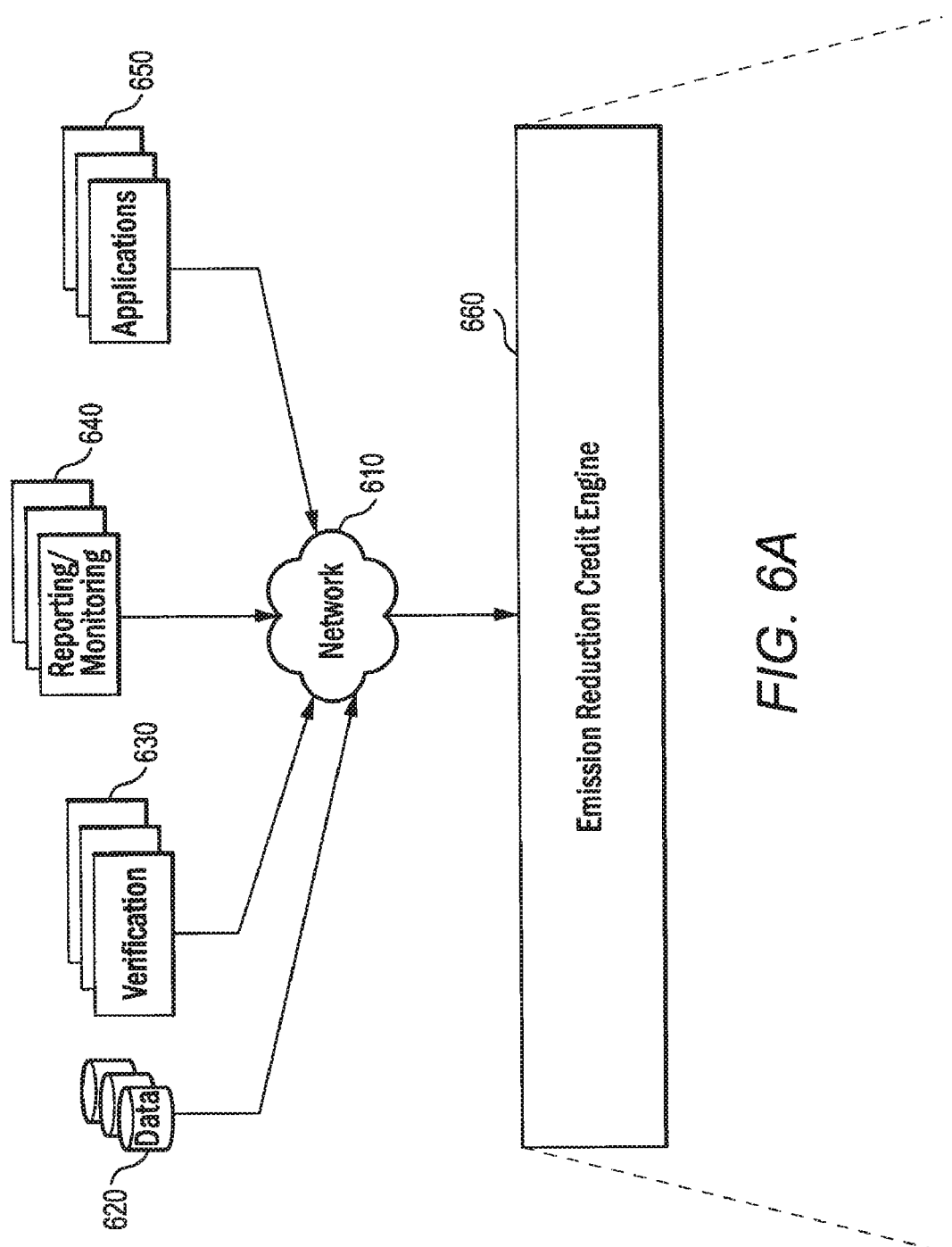
FIG. 6 is a high level system diagram of a service orientated architecture for the generation of standardized CERCs according to one embodiment of the present invention
Figure 6B:
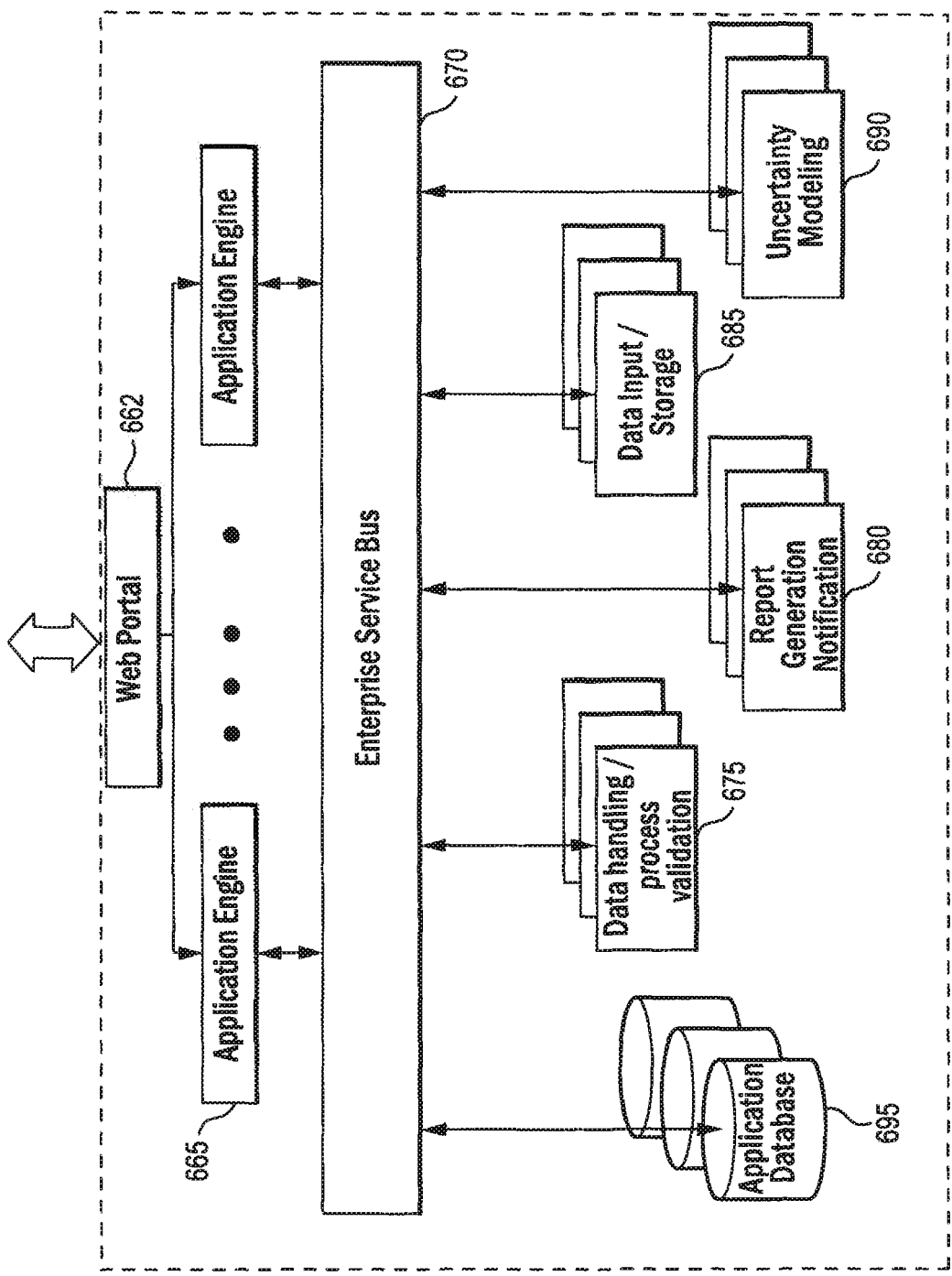

FIG. 6 is a high level system diagram of a service orientated architecture for the generation of standardized emission reduction credits such as CERCs according to one embodiment of the present invention. Consistent with the previous discussion, one system suitable for implementation of the present invention includes a emission reduction credit engine 660 communicatively coupled to a network 610 (e.g. the Internet or an Intranet) that is interposed between the emission reduction credit engine 660 and a plurality of data repositories 620 and modules including a verification module 630, a reporting/monitoring module 640 and application modules 650. While the present invention can be implemented in association with the Internet it is also equally capable of being utilized with one or more other wide area networks. Furthermore, a system for analysis of emission reduction credits as described herein can be established on a local area network and isolated from external or third party access.

As is described herein the emission reduction credit engine 660 possesses broad applicability across numerous carbon emission sources. Each application of the emission reduction credit engine is associated with a unique data repository 620, a unique verification module 630, a unique reporting/monitoring module 640 and a unique application module 650. For example, a system for standardized CERCs of the energy production plant would include a database possessing data specific to energy production and consumption and a verification module associated with specific processes and services that can independently verify carbon credit generation or reduction. The same energy based emission reduction credit system further includes an energy orientated reporting/monitoring module for the collection of emission data and an application module for interaction with an energy customer. This general modular architecture is both vertically and horizontally scalable so that additional hardware can be added to support increased demand. In doing so multiple vertical applications can be built within a single enterprise installation while common functions are handled by the core infrastructure. Furthermore the functionality can be split over multiple machines horizontally to balance the workload present on any one machine.

Turning now in addition to the emission reduction credit engine 660, a general architecture for a system for the generation of standardized carbon emission reduction credits can be seen. At a high level the emission reduction credit engine 660 employs a distributed application architecture with various modules interactively coupled through an enterprise service bus 670. Input, reporting and monitoring/modeling components run, according to one embodiment of the present invention, in a distributed environment using messaging capabilities of the enterprise service bus 670. The system can use open standards to provide a web-based zero footprint user interface while external applications and edge components communicate with the service bus using Simple Object Access Protocol (SOAP) based web services. According to one embodiment of the present invention the services can be described suing Web Services Description Language (WSD) with internal components communicating using Java Message Service (JMS) based messaging.

According to one embodiment of the present invention operations of the system are initiated by invoking a web service, which in turn places a message on interface service bus 670. The enterprise's service bus 670 delivers messages to the particular component responsible for processing a certain type of message. The results from that particular component are returned to the original caller as a return value of the web service. Message operations can either be synchronous, using remote procedure call paradigm for short operations, or asynchronous for long process model runs. Messaging of this type enables each tier of the application; the web, service bus, database, monitoring, etc., to run an separate computing environments. According to another embodiment of the present invention the enterprise service bus 670 saves messages into a persistent store when they are first placed on the bus. If the component which processes that type of messages is, for some reason, unreachable or busy, the message is held until that component is again available. This particular feature of the present invention adds fault tolerance and resilience to the system.

In the present depiction a central web portal 662 receives and transmits all communication from the emission reduction credit engine to the network 610 and thereafter the representative application modules, i.e. energy modules. The web portal 662 channels information to the enterprise service bus 670 via dedicated application engines 665. Turning back to the example of an energy plant emission reduction credit application and according to one embodiment of the present invention, the web portal 662 would dispatch data received via the network 610 from the energy data repository 620, the energy verification module and services 630, the energy reporting and monitoring module 640 and the energy application module 650 to the energy application engine 665 for processing using standard communication protocols. The energy engine 665 would thereafter access various resources through the enterprise service bus 670. According to one embodiment of the present invention, the centralized enterprise service bus 670 centrally manages security and auditing processes to minimize duplication of resources. The centralized enterprise service bus 670 also enables loose coupling of the components which increasing the overall flexibility and scalability of the architecture.

Loose coupling is understood to mean that a component coupled to the bus exposes its functionality through well-defined standards based interface, but that its internal workings are opaque to that interface. This enables a plug and play type of application development. Components that perform a given operation differently, but support the same interface, can be swapped as required for a he is or particular configuration.

Communicatively coupled to the enterprise service bus 670 is a plurality of modules and application databases. As depicted in FIG. 6 each sector includes one or more application databases 695, a data handling and processing module 675, a report generation and notification module 680, a data input and storage module 685 and a modeling and uncertainty analysis module 690.

Thus for illustration purposes, and ease of understanding, emission reduction credit applications in the environmental, commercial, agricultural and energy sectors for instance would each possess a database for storage of relevant application data 695, a validation module 675 created to handle and validate data particular to that sector, a module for data input and storage 685, as well as a module to generate reports 680 specific to that particular sectors, e.g. energy vs. agriculture, and a module for conducting an uncertainty analysis 690.

The architecture of the present invention also includes a security and auditing policies. The security policies are applied in a user interface to prevent users from attempting operations that they are not allowed to perform. These policies are enforced on each message placed on the enterprise service bus 670. This feature of the present invention allows for centralized management of the security policy and insures that external applications accessing the system are subject to these policies. Furthermore auditing is performed at each tier of the system. Messages initiate operations, therefore message traffic is audited and logged in the enterprise service bus 670 to insure that operations performed by external applications are recorded.

The present invention used three approaches to provide a high degree of scalability and extensibility. First, functions are split over multiple tiers including input functions, data clean-up, and normalization and calculation engines run on separate layers of the application. This provides separate hardware computing environments. Second, cluster servers are used according to one embodiment of the present invention at each tier to provide horizontal scalability. Finally, multiple instances of modeling and calculation components can be deployed into separate hardware components which are thereafter load balanced by using a message queuing system.

Well-defined interfaces are provided to facilitate development of custom monitoring and calculation modules. Similarly as new sources of data are integrated into the system, acquisition processes can be developed to deliver information to web-service based interfaces that initiate calculations and generate reports.

While FIG. 6 and the above text describes an architecture with specific sector related modules and engines, one skilled in the relevant art will recognize that this depiction is for functional purposes only and that any single module or engine may be distributed across one or more machines located at a central location or dispersed geographically. Furthermore, one skilled in the art of computing will recognize that beyond the basic functional architecture described above numerous processes with respect to the servers and infrastructure surrounding the emission reduction credit engine 660 exist but are not shown. These and other processes are well known and will not be described further.

Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Figure 7:
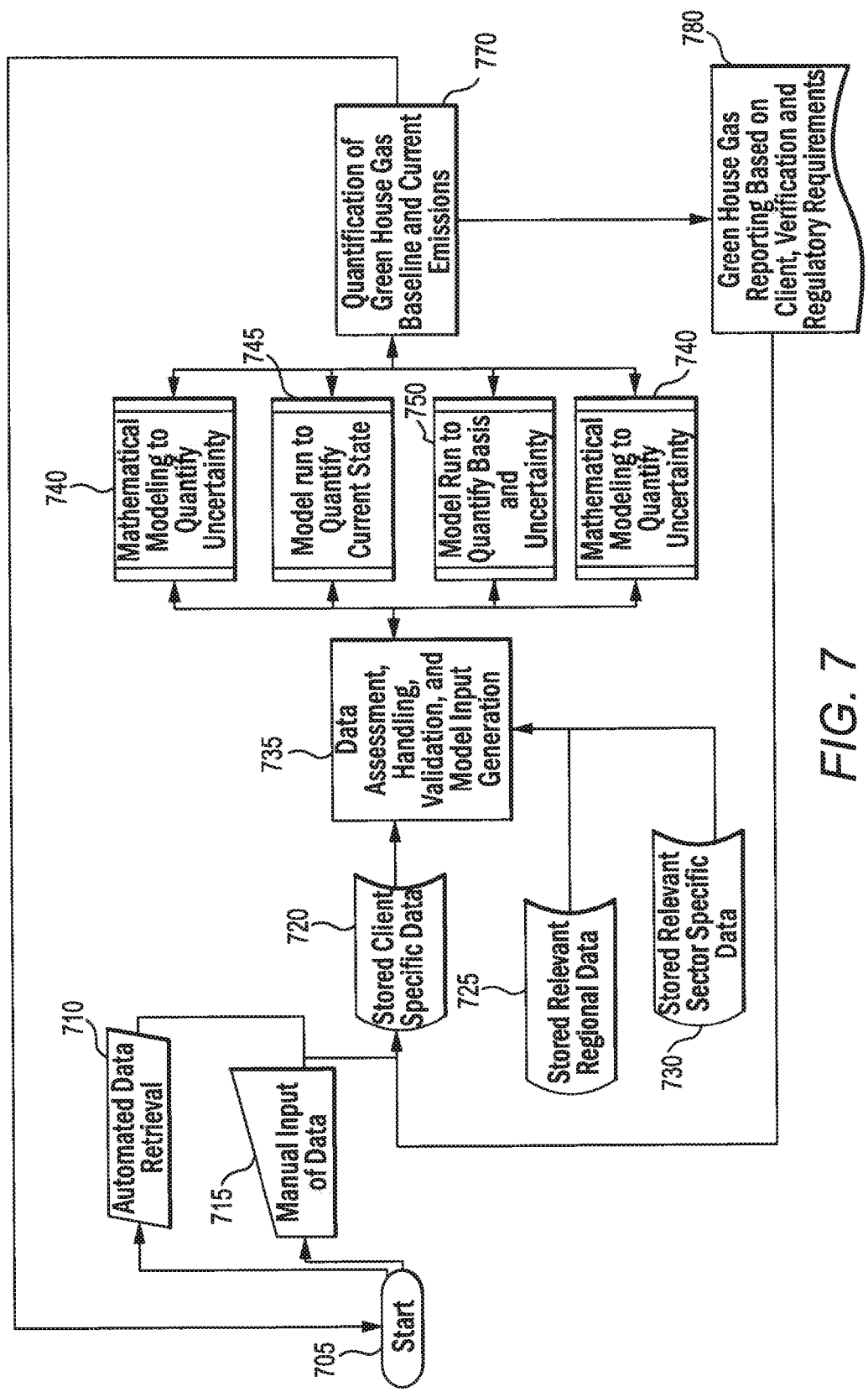
FIG. 7 is a process timeline flowchart of one embodiment of the present invention for CERC or other emission reduction credit analysis.

FIG. 7 is a process flowchart according to one embodiment of the present invention, showing the relative timing and steps in a typical CERC or other emission reduction credit analysis. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

As shown in FIG. 7, the process fundamentally begins with the collection of data needed for a CERC or other emission reduction credit analysis however it can be seen that the analysis and data retrieval is iterative. As the analysis is conducted, data validated, and results assessed, new or additional data may be requested and retrieved that may alter the final outcome of the analysis. Indeed the type of data retrieved may depend on a quantification of green house gas emissions.

Thus while the following description describes each aspect of the flowchart shown in FIG. 7 it should be understood by one skilled in the relevant art that the process involves multiple interactions of several discrete processes that form an interdependent relationship.

To better understand the CERC or other emission reduction credit analysis consider a process beginning 705 with a emission reduction credit analysis request from a particular client operating in a specific industrial sector. To conduct the analysis data must be gained from the client. Such data can be gained via automated data retrieval 710 or (alternatively or in addition) be manually input 715. Turning in addition to FIG. 6 it can be seen that the reporting and monitoring module 640 working with the emission reduction credit engine 660, retrieves both automated and manually reported data to conduct a carbon emission analysis. The reporting and monitoring module 640 may include a plurality of sensors that can automatically retrieve and provide wide ranging details regarding a particular system. That data can be combined with, and augmented by, specific data input by a user familiar with the process being evaluated. Furthermore stored relevant regional data 725 and stored relevant sector specific data 730 from data repositories 620 is also retrieved and combined with the other gained data to be used in the analysis.

Once a locus of data is retrieved, it is assessed, handled and stored 735. These processes are conducted by the data input and storage module 685 and the data handling, processing and validation module 675. Thereafter data is conveyed to one or more modeling processes including a mathematical modeling process to quantify uncertainty 740 using a model run to quantify the current state of the data 745 and/or a model run to quantify the basis of the uncertainty 750. These modeling processes are implemented by one or more modeling and/or uncertainly modules 690 which are coupled to the enterprise service bus 670.

Each of these processes also interact with a quantification of baseline and current green house gas emissions 770. The green house gas current and baseline emission data is reported 780 based on client, verification, and regulatory requirements. These requirements and reports are stored and maintained as client specific data 720. It should also be noted that the quantification of green house gas emissions, both baseline and current, can impact what data is retrieved. Depending on the green house gas emissions different data may be sought via automated data retrieval 710 or via manual data retrieval 715. With newly gained information the CERC or other emission reduction credit process is once again initiated which may reveal new, but more reliable uncertainty values.

The accrued and/or projected standardized CERCs may be marketed or sold through a wide variety of means, including direct solicitation to potential CERC purchasers, advertising, auction, etc. Preferably, the standardized CERCs are placed in the open market for sale or trade via an on-line auction or through one or more on-line auction services.

In another embodiment of the invention, one or more other variables which limit the acceptance of a standardized CERC may be identified, analyzed, estimated or preferably quantified and communicated to the potential CERC purchaser. This can operate to reduce, or preferably remove, a variable for the potential purchaser, thereby increasing its value to the CERC producer.

For example, the CERC requirement of ownership may be analyzed, an uncertainty determined and the conclusion presented to the potential CERC purchaser. Preferably, the landowner is requested to provide information in response to questions directed to ownership and other rights to the land that may have an impact on the ownership of CERCs generated from the prior or future land use. Such inquires may include the identity of all entities with potential rights to ownership, use, occupation, easement, etc. of the land, the nature of such rights and the parties practices. The inputted ownership information is compiled and can be directly communicated to the potential CERC purchaser. Preferably, the inputted ownership information is analyzed, whether by a person or a program, to assess possible ownership issues and to provide a report. Generally, a response that no such other entity exists would decrease the risk of an ownership issue, whereas a positive response would enable a potential CERC purchaser to more accurately assess such a risk.

Similarly, the requirements of leakage and permanence may be included in the determination of establishing a standardized CERC. Preferably additional inquiries are submitted to the landowner designed to identify, ascertain and assess issues related to leakage and/or permanence of any CERCs generated through the management of the parcel of land. For example, to establish permanence, the landowner may be required to certify the practice of a specific agricultural rotation sequence for defined time period. In a more specific example, the landowner may document past land use history and certify the practice of no-till wheat cultivation for three out of the next ten years. Based on landowner submissions, a fraction of the CERCs generated, if any, can be standardized for trade and a fraction can be held in reserve.

An example of the operation of one embodiment of the invention follows. A potential CERC producer accesses a website that includes background and reference material, as well as an interactive interface capable of receiving and transmitting data. In response to an inquiry, the potential CERC producer identifies a parcel of land by geographic location.

The geographic location is utilized to identify the specific land parcel and the total area of the land parcel. The geographic location also is used to obtain general data relevant to carbon sequestration in soil for that land parcel from a database containing geographically referenced general data relevant to carbon sequestration in soil, such as land use history, climate and soil texture. A baseline level of business as usual carbon emissions is also obtained, preferably from a database of such baseline levels referenced by geographic location and/or type of activity, such as farming. The relevant general data is input into a carbon sequestration model to determine whether the carbon reservoir of the soil is full. If it is full, the soil is not capable of satisfying the requirement of additivity and CERCs will not be generated. If the carbon reservoir is not full, the potential CERC producer is prompted to provide additional site-specific data.

The site-specific data requested may depend on the geographic location of the land parcel. Typically, the potential CERC producer would be requested to identity, as accurately and as completely as possible, detailed land use history for each year since 1990, such as 1) the type, planting month and senescence of annual plants on the land; 2) the type, first growth month and senescence of perennial plants on the land; 3) the type of cultivation each month; 4) the type, form and amount of each fertilizer each month; 5) the type and amount of organic matter additions each month; 6) the type and amount of irrigation each month; 7) the type and yield of harvest each month; 8) whether winter grazing or pasture grazing; and 9) if pasture grazing, the type and number of animals grazing each month.

The site-specific data may be tested. For example, if the site-specific data is not complete, the website may prompt the potential CERC producer for additional information. If the site-specific data is still not complete thereafter, the general database may be accessed to determine if general data is available to substitute for the missing site-specific data. If such general data is obtained or used, the uncertainty analysis is adjusted to reflect the greater level of uncertainty of that data. Other tests also may be conducted, such as testing the site-specific data to determine if it falls within prescribed ranges or values of related general data from the database and comparing input data for specific years to satellite-imagery to determine congruence.

The site-specific data, along with the general data relevant to the land parcel obtained from the general database, as well as the baseline level, are input into a carbon sequestration model to determine the approximate change, if any, in the level of carbon compounds stored in the soil since 1990. In this example, the potential CERC producer is only requested to provide data back to 1990, while the database provides all data prior to 1990. Even with the use of such general data, standardized CERCs may be generated and quantified with reasonable and acceptable accuracy by the use of an uncertainty analysis.

The data input and therefore the results of the carbon sequestration model are subjected to an uncertainty analysis, whereby the relative uncertainty of the results can be quantified, based on a desired confidence threshold. The approximate change in the level of carbon compounds in the soil may then be expressed as standardized CERCs and reserve CERCs, accrued since 1990 to the date of the analysis. The results are communicated to the potential CERC producer through the website.

The website also will allow a determination of the amount of future standardized CERCs that may be generated if the CERC producer were to commit to certain actions into the future. For example, in response to inquiries, the potential CERC producer inputs data as to future actions for defined time periods, such as changing to no till agriculture for ten years, or rotating soybeans and corn every other year for eight years, etc. Preferably, the website identifies possible actions that would most increase standardized CERC generation, based on the site-specific data and general data previously entered, and prompts the potential CERC producer to select from one or more of a plurality of choices. The selected data is inputted, the carbon sequestration model program and uncertainty analysis are conducted, future standardized CERCs and future reserve CERCs are quantified and the results are communicated to the potential CERC producer.

The potential CERC producer optionally may request one or more alternative runs to determine the projected number of future standardized CERCs, based on changing selected input variables. The potential CERC producer preferably is given the opportunity to contractually commit to a specific course of action for a specific time period, and is awarded the number of projected future standardized CERCs and reserve CERCs based thereon.

The accrued standardized CERCs are placed into a pool of accrued standardized CERCs with those of other CERC producers, the future standardized CERCs are placed into a pool of future standardized CERCs with those of other CERC producers and the reserve CERCs are placed into a reserve pool with those of other CERC producers. These pools, separately or in combination, may be offered for sale, preferably on the open market though competitive bidding.

Because the landowner supplies much of the data used to generate and quantify standardized CERCs, the costs can be reduced. Because a landowner is not required to supply detailed land use history data or other data prior to 1990, and perhaps not even complete data after 1990, and is not required to supply other data such as climate data, greater numbers of landowners can participate in generating CERCs and contributing to a pool of CERCs with other landowners. Because the process to generate and quantify the standardized CERCs is transparent and reproducible, it is well suited for independent verification and auditing by third parties. Because the process is flexible, it may be modified to respond to evolving carbon trading and greenhouse gas reduction policies and regulations and to incorporate evolving technology and science findings. Overall, the method and apparatus of the present invention are designed to facilitate the participation of individual landowners in the CERC market, maximize the value of the CERC generated, increase the price paid to the CERC generator and lower the risk to the CERC purchaser.

The general database described herein may alternatively be used in a variety of resource management related issues. For example, a module can be added that could be linked to soil-erosion and hydrology models. A landowner could then enter the coordinates for a specific land parcel and receive a plan for the specific locations of grassland buffer strips that would decrease soil erosion by specific amounts. Alternatively, a module could be added to generate and quantify standardized CERCs based on capturing methane emissions from manure storage and processing lagoons. These alternative projects share several common elements, including a customized data base, such as a general database, to define important controlling variables, a producer-accessible interface for project-specific data, linkages to data processors adapted to run numerical models and data processors adapted to run uncertainty analyses. These systems are designed to readily adapt to current and evolving regulatory requirements.

The invention also may be advantageously applied to sequestration and/or reduction of emissions of greenhouse gases other than carbon dioxide. These greenhouse gases may include nitrous oxide and methane, or any other greenhouse gas identified by the International Panel on Climate Change (IPCC), regulatory agency or other authority. The invention also may be advantageously applied to reduction of business as usual greenhouse gas emissions and/or sequestration into media other than soil, such as trees, other vegetation, aquatic systems and marine systems.

The invention also may be advantageously applied where CERCs are produced as a consequence of substitution of renewable carbon, such as biomass and/or methane from landfills, for fossils fuels. The specific module would be designed to define the CERC production and uncertainty to normalize their value and document their compliance with regulatory requirements.

In another embodiment of the invention, one or more of the methods described herein can be used to quantify and normalize CERC generation for businesses engaged in carbon sequestration projects or to other greenhouse gas mitigation efforts, including, e.g., emissions of methane from animal feedlots and manure storage facilities. Modules can be added to quantify CERCs that will meet the regulatory requirements for documenting CERC generation for those applications. This reduces and preferably eliminates uncertainty for the potential CERC purchaser, thereby increasing the value of the CERC to the CERC producer.

In yet another embodiment of the invention, one or more of the methods described herein can be used by those who regulate and/or report greenhouse gas emissions and/or mitigation efforts. This would provide verification of local, regional, national and international greenhouse gas reduction efforts. So, for example, utilizing such an embodiment of the present invention, electric generation utilities can provide an accurate determination of pollutant emission rates, quantify reductions in $CO_2$ and other greenhouse gas emissions resulting from specific actions that would otherwise be lost in the complexity of power plant operation. The techniques of this embodiment allow for uploading of data, computations, tracking and data storage needed to handle the massive data streams produced by modern power plants, and then to apply uncertainty analyses so as to be able to report reliable emission reduction numbers certifiable as reductions qualifying under applicable regulations or standards and/or tradable or untradeable as emission reduction credits.

Reduction in power plant greenhouse gas emissions can be achieved through certain improvements in power efficiency, and accurate quantification of actual reductions in greenhouse gas emissions and related accurate determinations of tradable and untradeable emission reduction credits can be obtained with the methods of apparatuses of the present invention. For each power plant facility and each unit in the facility, plant efficiency if affected by fuel quality, unit loading, and unit process conditions. Fuel quality variables, can include, for example, percentage of sulfur, percentage of ash, and carbon content per unit of energy. The unit process conditions include, by way of example, boiler efficiency, turbine cycle efficiency (or heat rate), auxiliary loading, and amount of steam taken for heating. Ambient conditions, unit maintenance, equipment conditions all have an effect.

Figure 8:
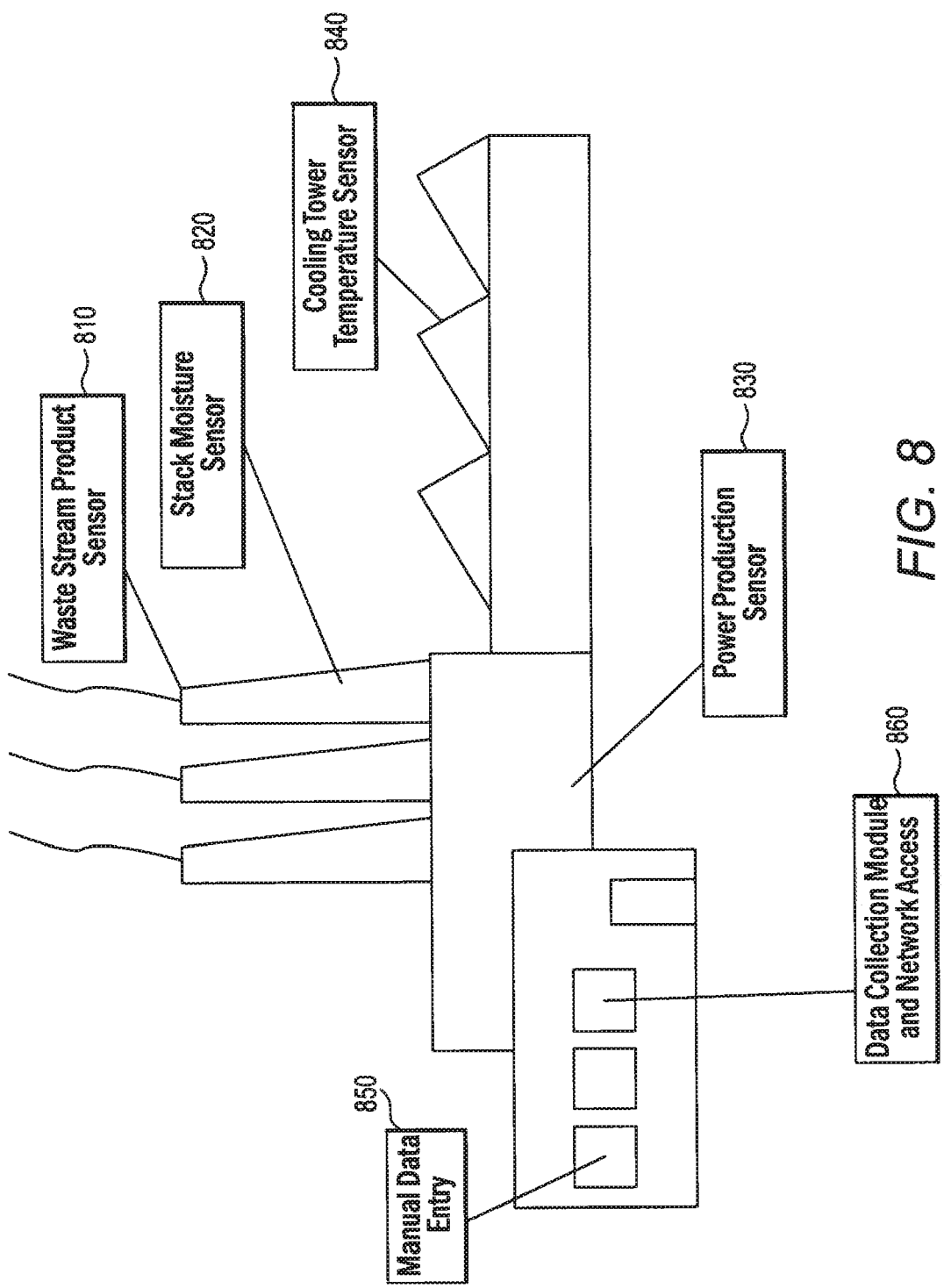
FIG. 8 depicts an embodiment of a system of the present invention used to generate standardized emission reduction credits and untradeable reserve emission reduction credits for a power plant.

Generally, to identify and consider possible mitigation efforts expected to have significant effect on $CO_2$ and/or other greenhouse gas emissions, assessment of an existing power generation facility, such as a coal-fired power plant, is undertaken. An exemplary system of the present invention is shown in FIG. 8, which may be used to determine and generate standardized emission reduction credits and untradeable reserve emission reduction credits for a power plant. As shown in FIG. 8, numerous sensors are positioned in and near the power plant for obtaining relevant data relating to flow rates, temperatures, pressures, particulate matter, gas compositions, energy produced, energy consumed, raw fuel consumed, waste streams, etc. Exemplary sensors include waste stream product sensor 810, stack moisture sensor 820, cooling tower temperature sensor 840, and power production sensor 830. Other sensors collecting information about air preheating operations (e.g., temperature, energy used to preheat air, etc.), ash collected (e.g., weight of ash collected in ash removal system), flue gas temperature, moisture and content, etc. Data from sensors 810, 820, 840 and 830 are transmitted through either wired or wireless communications (not shown) to data collection module 860. Other data is collected from analytical tests performed in batches, for example, analytical composition of raw fuels and of waste streams such as materials collected from filters, resins or the like. Such other data is also provided to data collection module or may be input via manual data entry module 850.

The assessment of a subject facility to evaluate and document mitigation effects initially involves a determination of a historical baseline of $CO_2$ and/or other greenhouse gas emissions along with bias and uncertainty determinations of the previous $CO_2$ and/or other greenhouse gas emission measurements. If related information is available for a similar power generation facility but one characterized as being near optimal operational efficiency and offering minimal opportunity for emission reductions, then such information is helpful in estimating the possible improvements achievable in the subject facility. To this end, data is collected from enterprises from the one or more regions in which facilities are located, from the facility or facilities in each region, and from the units or units in each facility. In each facility, there are multiple, relevant individual components to be measured or tracked.

Most preferably, historical baselining collects information at individual component levels. This is because many factors influence the measurements for each component. Examples include exhausting multiple units through a single stack, normal degradation of equipment, seasonal influences on performance.

Existing practices and feasible alternative to reduce $CO_2$ and/or other greenhouse gas emissions are identified for a facility. A plan to implement one or more of the feasible alternatives is then devised. The plan is then implemented and the incremental effects on greenhouse gas emissions are then tracked over time through measurement and determinations. The determinations are made by individual modules developed particularly for each type of alternative implemented. For example, a specific turbine upgrade module quantifies the $CO_2$ reduction based on efficiency test data. A fuel modification module quantifies the $CO_2$ reduction or reduction of other greenhouse gas relating to change in fuel such as a change in coal from a high-sulfur content coal to a low-sulfur content coal. A stack gas processing upgrade module quantifies greenhouse gas reductions resulting from modifications to scrubbing, filtration or other systems which remove materials in the gases produced during combustion at a plant.

Performance and emissions after implementation of any improvements, whether to a plant, to practices, to fuels, etc., are then tracked over time so as to establish the incremental increase in performance related to a specific improvement. In the determinations of emission rates, preferably at least two but most preferably at least three independent methods are used to most accurately determine the actual emissions for each greenhouse gas. This allows to better determine the potential for bias in any of the measurements. For example, the preferred three methods for $CO_2$ determinations for use with coal-fired power plants are (a) CEMS stack flow method; (b) Carbon-Mass Balance (CMB) based on a combination of coal tonnage data, coal quality data and unburned carbon data to determine a Collective Dose Equivalent (CDE) emitted at each unit; and (c) Generalized Emission Factor based on data for the particular equipment at a facility in conjunction with basic facility gross generation data.

More particularly, in a preferred embodiment of the present invention relating to determining $CO_2$ emissions and reductions of same after implementation of operational changes such as changing fuel, updating equipment, adding filtration, scrubbing and other equipment to react with waste stream components, and changing operational parameters, separate modules for measuring emissions include a continuous emissions monitoring module, a carbon balance module, and a generalized emissions factor module. In addition to determining each particular emission based on multiple methods, bias and uncertainty analyses based on emission records and calibration data are conducted. Intensity analyses are also performed to provide an indication of plant efficacy and the potential for emission measurement errors. Using standard deviation analysis on intensity data, abnormal fluctuations in intensity (emissions from a unit divided by energy production from the unit over a specific time period) are identified as possibly involving measurement errors and is filtered out. Data may also be filtered to identify shifts in intensity when a unit is functioning at a steady state, so as to avoid use of less reliable emission data. Emission data with standard deviation from a particular plant or unit can then be utilized because it is determined to be reliable and is not filtered out.

More particularly, in relation to the multiple modules for measuring emissions, the carbon mass balance module performs a carbon mass balance on individual units within a power plant to determine $CO_2$ emissions. The primary carbon source is provided by the fuel. Carbon sinks include the carbon contained in the unburned carbon and the carbon contained in the fuel loss during the pyrite rejection at the pulverizers. Assuming that CO production is negligible, which is typical for almost all coal-fired power plants, the $CO_2$ emission can be quantified with the following equation:

$$M_{CO2} = K^*[M_{C\,Fuel} + \Sigma M_{C\,Sources} - \Sigma M_{C\,Sinks}] \quad (1)$$

where:
$M_{CO2}$ is the mass of $CO_2$ emitted from unit,
$M_{C\,Fuel}$ is the mass of carbon in fuel,
$M_{C\,Sources}$ is the mass of carbon in miscellaneous sources,
$M_{C\,Sinks}$ is the mass of carbon in miscellaneous carbon sinks,
K is the ratio of the molecular weight of $CO_2$ to elemental carbon (44.0/12.0).

Figure 9:
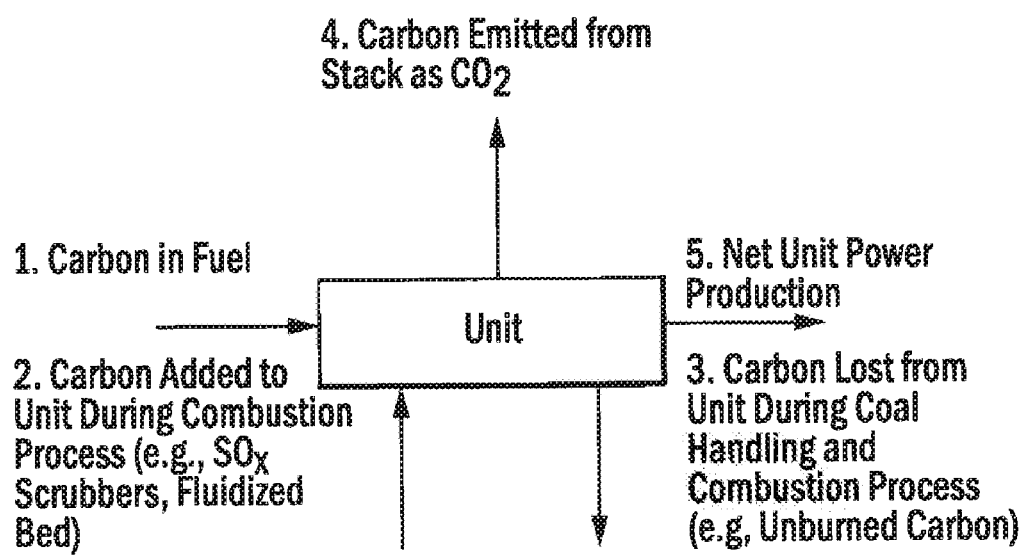
FIG. 9 is a schematic diagram of carbon balance factors associated with a power plant unit.

$CO_2$ emissions can be normalized with respect to the net unit energy production to quantify the $CO_2$ emitted by the plant per unit of energy created. FIG. 9 presents the parameters of concern in the carbon balance for computing the $CO_2$ emissions versus net unit power production.

The data required to compute the $CO_2$ emissions based on a carbon balance consists of the following points contained in three data sets as shown in Table 1 below

TABLE 1

| | |
|---|---|
| Unit Fuel Rate, Power | unit mass coal flow rate |
| | unit gross generation |
| | unit station service |
| Fuel Analysis | total moisture, as-received basis |
| | ash, as-received basis |
| | higher heating value, as received basis |
| | carbon, dry basis |
| UBC and Pyrite Loss | unburned carbon as percent of ash |
| | percent of pyrites contained in fuel |
| | ratio defining quantity of fuel ejected per unit mass of pyrite ejected |

The data defined in the Unit Fuel Rate set will typically be data with a sampling frequency of an hour or less. The sampling frequency of the coal analysis data will be much lower, and may vary from daily to monthly. The unburned carbon and pyrite loss could be defined by constants without affecting the uncertainty in the results a significant amount. In addition to the data input, error estimates are required for each data point.

Additional data obtained from the proximate and ultimate fuel analyses includes the following.
1. sulfur, as-received basis from proximate analysis
2. hydrogen, dry basis from ultimate analysis
3. nitrogen, dry basis from ultimate analysis
4. oxygen, dry basis from ultimate analysis Although these data are not required for performing carbon balance calculations, they are included because they may be useful for performing quality checks on the data and for computing other emission quantities if desired.

The equations implemented in the carbon balance are described below. The data is assumed to be input on a consistent basis. Therefore, specific units are not included in the calculation description. Uncertainty calculations are also described below.

Determining the carbon in the fuel requires a coal laboratory analysis. The most fundamental coal analysis is a proximate analysis which provides the percent moisture, ash, and sulfur, on an as-received basis. The percent carbon in the fuel is determined as part of an ultimate analysis in which all quantities are typically reported on a dry basis. With the dry basis, all external and intrinsic coal moisture has been removed. The first step for computing the carbon in the fuel is determining the carbon content of the fuel on an as-received basis which is deemed to best represent the coal as it is weighed by the coal mass flow device. The following equation is used for this conversion.

$$C_{AR}=C_{Dry}*(100-\text{Moisture}_{AR})/100 \quad (2)$$

where
$C_{AR}$=percent carbon on an as-received basis,
$C_{Dry}$=percent carbon on a dry basis,
$\text{Moisture}_{AR}$=percent moisture on an as-received basis.
The carbon in fuel is quantified with the following equation:

$$m_{C\,Fuel}=m_{Fuel}*C_{AR} \quad (3)$$

where
$m_{C\,Fuel}$=mass flow rate of carbon from the fuel,
$m_{Fuel}$=mass flow rate of fuel.

The mass of the fuel is an input required by the carbon balance module. Representative sources of these data include belt scales or batch scales.

Additional carbon may be added to the unit during the combustion process which is subsequently emitted from the stack. Examples of these sources include reagents used in fluidized bed boilers, reagents added in sulfur dioxide scrubbers, and fuel additives for slag mitigation. These are ignored for the Phase 1 development effort.

Two carbon sinks are included in the carbon balance module: 1) unburned carbon in ash; and 2) the carbon contained in the fuel which is part of the pyrite rejection process at the pulverizers. Unburned carbon is commonly reported as a percentage of the carbon in the ash. Unburned carbon is contained in both the bottom ash of the boiler and in the fly ash collected in the electrostatic precipitators. The percent of unburned carbon in ash may vary between these two locations. However, the carbon balance module is based on quantifying the carbon in ash with a single number. This simplifies the input data and is reasonable because a one percent error in the unburned carbon produces only an error of a few hundredths of a percent in the $CO_2$ emissions.

Quantifying the carbon lost in the unburned carbon first requires that the total amount of ash entering the unit be computed:

$$m_{Ash} = m_{Fuel} * \frac{Ash_{AR}}{100} \quad (4)$$

where
$m_{ash}$=mass flow rate of ash,
$Ash_{AR}$=percent of ash in fuel on an as received basis.
The carbon is then quantified by multiplying the ash times the unburned carbon percentage:

$$m_{C\,UBC} = m_{Ash} * \frac{UBC}{100} \quad (5)$$

where
$m_{C\,UBC}$=mass flow rate of unburned carbon in ash,
UBC=unburned carbon as percent of ash.

All coal sources contain pyrites. When pyrites are removed at the pulverizer, some fuel (containing carbon) may also be ejected. Computing the amount of carbon lost with pyrite removal first involves computing the total quantity of pyrites rejected.

$$m_{Pyrites} = m_{Fuel} * \frac{\text{Pyrites}}{100} \quad (6)$$

where
$m_{Pyrites}$=mass flow rate of pyrites,
Pyrites=percent of pyrites in fuel.

The quantity of carbon ejected is then computed by multiplying the amount of pyrites removed by a fuel-to-pyrite ratio, which quantifies the proportion of fuel present in the pyrites removed, and multiplying by the carbon content of the fuel.

$$m_{C\,Pyr} = m_{Pyrites} * FuelToPyrite * \frac{C_{AR}}{100} \quad (7)$$

where
$m_{C\,Pyr}$=mass flow rate of carbon in fuel removed with pyrites,
FuelToPyrite=fuel-to-pyrite ratio.

The default value of the fuel-to-pyrite ratio used in the carbon balance module is 1, which means that one pound of fuel is removed for every pound of pyrites removed.

The net unit power production represents the power generated by the unit which is placed on the grid. Net unit power is computed with the following equation:

$$P_{Net}=P_{Gross}-P_{SS} \quad (8)$$

where
$P_{Net}$=net unit power production,
$P_{Gross}$=gross unit power production,
$P_{SS}$=power consumed by station service.

The net unit energy production is computed by integrating the net unit power production over the desired time period:

$$E_{Net}=\int P_{Net}dt \quad (9)$$

where
$E_{Net}$=net unit energy production.

Once each carbon source and sink term is determined, the carbon dioxide emitted at the stack is computed by performing a mass balance:

$$m_{CO2} = \frac{44}{12}[m_{C\,Fuel} - m_{C\,UBC} - m_{C\,Pyr}] \quad (10)$$

where
$m_{CO2}$=mass flow rate of carbon dioxide.

The total quantity of carbon is computed by integrating the mass flow rate of carbon dioxide over the desired time period:

$$M_{CO2}=\int m_{CO2}dt \quad (11)$$

where
$M_{CO2}$=mass of $CO_2$ emitted over the integration time period.

Given the mass of $CO_2$ emitted by the unit and the net unit power production, the carbon dioxide emitted per unit of energy production is computed with the following equation:

$$CO2\,perEnergy = \frac{M_{CO2}}{E_{Net}} \tag{12}$$

where $CO_2$perEnergy=$CO_2$ emitted by the unit per unit of energy produced by the unit.

Another quantity of interest computed from the input data is the unit efficiency, which is most commonly expressed in the power industry as the chemical energy in the fuel required to produce a unit of energy.

$$HR_{NU} = \frac{M_{Fuel} * BTU}{P_{Net}} \tag{13}$$

where $HR_{NU}$=the net unit heat rate,

BTU=the energy content of the fuel.

Two factors affect the error in the test result for each measurement performed in a test. These are the error in the measurement and the sensitivity coefficient. Measurement errors are inputs provided to the carbon balance module while the sensitivity coefficients are computed by the module. Both of these factors are described in more detail below.

Measurement errors can be broadly divided into three categories:

1) The uncertainty due to variability with time.

2) The uncertainty due to accuracy limitation of the measurement device.

3) The uncertainty due to spatial variations of the quantity being measured.

A key assumption in the methodology outlined in ASME PTC 19.1 is that the process being evaluated is at steady state. However, even under steady-state conditions, the magnitude of the parameter being measured will vary with time. Measurement devices sample a continuous time signal and create a discrete, finite number of data points. When computing averages from the data points, it is important to evaluate how closely the computed average is to the true average of the sample. The precision error evaluates this quantity and can be computed from the individual measurement readings.

The first step in computing the precision error is to compute the standard deviation which is computed with the formula:

$$S = \sqrt{\sum_{i=1}^{n} \frac{(m_i - m_{avg})^2}{(n-1)}} \tag{14}$$

where

S=standard deviation, m=individual measurement reading, $m_{avg}$=average of measurement readings, n=number of readings.

The precision error in the test result is computed with the following equation:

$$U_t = t_v\left(\frac{S}{\sqrt{n}}\right) \tag{15}$$

where $U_t$=precision error, $t_v$=value of Student's t-distribution for v degrees of freedom, v=number of degrees of freedom.

The Student t-distribution quantifies, at a given confidence level, the interval in which the true average of the measurement lies. The 95% confidence interval is commonly used in performance testing. For example, assume that an average measurement of a process is 10.5 and the precision error is 1.0 at a confidence level of 95%. An alternate way of stating these results is that with a probability of 95% the true average for this measurement lies within the region of 10.5±1.0.

The accuracy limitations of instrumentation are affected by many factors which include the quality of the instrument, degradation of the instrument over time, and the calibration of the instrument. These errors are commonly referred to as bias errors and cannot be evaluated with the readings the instrument obtains. Rather, these errors are determined with a variety of information which include the manufacturer's specifications, calibration records, and experience with the instrument. When computing the total bias error of a measurement, it is usually necessary to combine the individual bias errors. For example, the individual bias errors may be the bias errors of calibration and a bias error associated with instrument fouling. The individual errors are combined with the following equation to compute the total bias error:

$$U_b = \sqrt{\sum_{i=1}^{k} E_i^2} \tag{16}$$

where $U_b$=total bias error, $E_i$=individual bias error, k=number of individual bias errors.

A third component of uncertainty is that caused by spatial variations of the parameter being measured. For example, a single point measurement is commonly used to measure the volume of flow in a conduit. The single measurement can be one of several fundamental physical parameters (e.g., dynamic and static pressures in a pitot tube), which is converted to a velocity based on physical principles. In determining the total, flow knowledge of the flow profile is also required. However, the shape of the flow profile is only known to a limited accuracy. This introduces error when converting point measurements to volumetric measurements. Coal sampling is another example where spatial variations in the coal stream or coal pile can have a primary effect on the measurement error of the coal properties.

This component cannot be determined from a set of data, but rather, must be evaluated based on several factors which include: physical characteristics of the parameter being measured; test results in which the entire flow field is measured; and experience with the measurement.

Once each individual component of the measurement uncertainty has been determined, the total measurement error is computed by combining the individual measurement uncertainties with the following equation:

$$U_T = \sqrt{U_t + U_b + U_s} \tag{17}$$

where
U_T=the total measurement uncertainty,
U_f=the measurement precision error,
U_b=the measurement bias error,
U_s=the measurement spatial uncertainty.

Calculating the uncertainty in a result caused by a given measurement requires that the sensitivity coefficient is known. The sensitivity coefficient can be evaluated by computing derivatives of the governing equations. However, a method which is more general and can be easily implemented in software is to compute the sensitivity coefficients with a difference equation:

$$U_R = \theta * U_T \qquad (18)$$

$$\theta = \frac{R_2 - R_1}{x_2 - x_1} \qquad (19)$$

where
$U_R$=uncertainty in the result,
θ=the sensitivity coefficient,
R=a result,
x=an independent parameter required to compute the result.

To compute the sensitivity coefficient for a given independent parameter (i.e., measurement), two values are required. The first value is a nominal value which is a commonly observed value. The second value is computed by adding a predetermined offset to the first value. For example, the second value may be 1% larger than the first value. Results are computed with each of these values, while holding all other independent parameters constant. The sensitivity coefficient is then computed with the two independent parameters and the two results. Sensitivity coefficients are often expressed in a non dimensional format:

$$\theta_{ND} = \frac{\frac{R_2 - R_1}{R}}{\frac{x_2 - x_1}{x}} \qquad (20)$$

For example, if the non-dimensional sensitivity coefficient is 1, a 1% error in the measurement produces a 1% error in the result.

Uncertainty analyses are implemented in the carbon balance module by computing the sensitivity coefficients with nominal values of the input data and then using these sensitivity coefficients with either default measurement errors, or with errors entered by the user, to compute the result errors. The data inputs described above, in the data requirements section, define the independent parameters used in this analysis. A non-dimensional sensitivity coefficient is computed for each independent variable as described in Equation 20. The errors in the result, created by each independent variable, are then computed from the non-dimensional sensitivity coefficients and the measurement errors. Total uncertainty is then computed with the following equation:

$$UR_T = \sqrt{\sum_{i=1}^{p} UR_i^2} \qquad (21)$$

where
$UR_T$=total uncertainty in the result,
$UR_i$=uncertainty in result due to a given measurement.

A few limitations are taken into account in the modules of the present invention. First, the methodology outlined in ASME PTC 19.1 requires that the process is at steady state. This requirement is ignored with the implementation of the carbon balance module in the present invention. How transient conditions affect the uncertainty estimates depends on several factors which include the load profile of the plant (i.e., whether it is base loaded or load following) and the frequency response of the instruments. Second, the precision error depends on the number of samples which are used to compute the average. This effect may be neglected or taken into account with precision with software to evaluate data and determine if the process is at steady state. The total error input by the user should include an estimate of the precision error.

Measurement uncertainty are preferably site specific because it depends a great deal on how proactive a utility's management is towards maintaining its instrumentation. Therefore, accurately evaluating the measurement errors at a particular utility would require an audit of its measurement system and maintenance program. However, in many cases, this will not be available. The following Table 2 presents recommended measurement uncertainty estimates when a more detailed site audit is not available. Since these error estimations are not based on site-specific information, they are intended to represent an upper bound of the measurement error. Also shown in Table 2 are the non-dimensional sensitivity coefficients. Measurement uncertainty is presented only for those input values which are required by the carbon balance calculations.

TABLE 2

Recommended Measurement Uncertainty Values

| Independent Variables | Units | Nominal Value | Total Measurement Uncertainty (% of measured value) | Non Dimensional Sensitivity Coefficient for $CO_2$/Net Energy Production |
|---|---|---|---|---|
| M_Fuel | klbs/hr | 70 | 1.0 | 1.00 |
| E_UnitGrossGen | kW | 100,000 | 1.00 | −1.05 |
| E_UnitSS | kW | 6,000 | 5.00 | 0.06 |
| Ash_AR | % | 9.00 | 10 | −0.01 |
| Carbon_Dry | % | 70.90 | 6.0 | 1.01 |
| BTU_AR | BTU/lb | 13,600 | 6.2 | −0.11 |
| Total_Moisture | % | 10.00 | 6.5 | −0.11 |
| UBC | % | 5.00 | 10.0 | −0.01 |
| Pyr | % | 0.10 | 10.0 | −0.001 |
| Fuel_Pyr_Ratio |  | 1.00 | 10.0 | −0.001 |

A brief description of the rational for these sensitivity coefficients is provided below.

- MFuel—1% is commonly accepted by utility engineers. Utilities typically maintain the coal scales well because of the large costs that would be incurred with errors in this measurement. With a sensitivity coefficient of 1.00 (i.e., a 1.0% measurement error produces a 1.0% error in the result) this is a critical measurement for the carbon mass balance.
- Unit Gross Generation—1.0% is commonly accepted by utility engineers. This is generally an accurate and well maintained measurement because it is the product a power plant produces. This is also a key measurement with a sensitivity coefficient of 1.0.
- Unit Station Service—Although in principal this quantity is measured with the same instrument as the gross generation, it is assigned a higher uncertainty. This is because there may be many station service measurements, some of which are common to several units, and there may be errors in apportioning them to specific units.
- Ash, Carbon, BTU—Errors occur both when the coal is sampled and during the laboratory measurement analysis. However, laboratory error is generally considered to be small relative to the errors that occur due to the sampling process. Sampling solid fuels is a complex process because of the difficulties of obtaining samples that represent the true average of the coal from a fuel stream which varies in time and in space. As a rule of thumb, the errors due to sampling and subsequent sample preparation can be an order of magnitude higher than the errors which occur during laboratory analysis. The uncertainty in the carbon measurement is likely to have the largest effect on the uncertainty of the results because of the large measurement error and the large sensitivity coefficient.
- Total Moisture—This can be affected by how well and how quickly the sample obtained at the plant is packaged, and how well it is managed in the laboratory. Another factor which may be important is that when the coal is consumed by the unit, the moisture may have changed as compared to the sample analyzed in the laboratory on an as-received basis. This may be especially relevant when coal is reclaimed from a reserve pile where the coal has been exposed to moisture (or drying) that is not accounted for in the laboratory analysis. The sensitivity coefficient shows that a 1.0% error in this measurement produces an uncertainty of −0.11%.
- UBC, Pyrite, Fuel-to-Pyrite Ratio—These have been assigned a default value of 10%. Because of the small sensitivity coefficients, the measurement uncertainties have a very small effect on the result uncertainty.

Data inputs to the carbon mass balance module are chemical analysis values that are subject to errors. Coal-fired power plants should use statistically 'in-control' coal sampling and analysis processes. Quality control is established for analytical instruments by use of standard reference materials and control samples. Results of coal analysis posted to reports from a lab that is "in control" have a lower estimate of total error than in the case where the sample and analysis methods are "haphazard" in nature. Differences between collected samples and some reference method of test samples can be used to establish the bias of a sample system. Biases in moisture, ash, sulfur, and Btu/lb are measurable by ASTM D 6518, "Bias test of coal sampling systems". If bias is found by this test, staff should work to minimize bias by changing the system and then retesting.

Accurate coal mass flow measurements (weights of coal burned per time period) receive a lot of attention at most power plants. Records of as-found and as-left scale calibrations are available at many plants. Uncertainty is estimated to be from 0.5 to 1%. Unaccounted for air-dry loss from the time of sampling to the delivery of the sample to the laboratory (part of the measurement of total moisture content) may be around 0.5% as well. Moisture is especially prone to error due to improper sample handling. This bias can affect all measured values (C, H, N, O, S, and Btu). Unaccounted-for loss of moisture creates a bias between measured values and values at the burners.

Nitrogen in coal is difficult to measure because it can't be easily distinguished from the nitrogen present in the laboratory atmosphere. Oxygen cannot be directly measured in coal; it is usually taken as the difference from 100% of the sum of all other organic constituents.

Sampling and sample preparation error must be considered by the user. These errors can be an order of magnitude higher than the errors which occur during laboratory analysis. Measurement errors are created during all the following processes:

Sampling coal,
Preparing the sample of coal for analysis,
Analysis of the prepared sample (lab),
Data handling processes.

In a conscientiously applied program of measurement control, the objective is to keep the variations due to measurement errors relatively small. A sample analysis represents 'lot' or 'batch' of coal, and must be tied to a weigh scale measurement. In this way, the specific mass of coal in tons that has been intentionally subjected to sampling by a designed method of incremental extractions from the coal stream; by a design that conforms in mass, timing, and operation parameters; and meets or exceed the requirements of ASTM standards. It is also highly desirable to assure there are no long-term trends producing values that are higher or lower than the latent value that would be produced by a repeated use of a reference system of measurement.

By conforming to these methods, the present invention seeks to reduce, but not eliminate, differences between measured values and the latent value one would expect from averaging the results of many repeated measurements of the same coal with the same system. The boundaries of uncertainty are then experienced based.

Differences due to bias are detected on a routine basis, because both the supplier and consumer of coal have access to sampling and analysis data that can be compared and discussed. Whenever purchaser and vendor data show differences that are as much as 200 Btu/lb, for instance, there are generally poor supplier/consumer relations, which lead to administrative actions to correct the problem of bias, by improving sampling and analysis processes. Today's environmental climate means that even more accurate measurements of coal quality (with lower bias and better precision) will be sought to ensure compliance with environmental regulations. This is a direct result of the cost and risk to the utility of poor measurement precision.

It is important that the processes associated with sampling and lab analysis be conducted in such a way that measurement errors are small enough to meet the requirements of those using the data. Bias must be eliminated or reduced to the smallest possible amount. Poor sampling precision will result in risks and costs, and ultimately poor judgments being made regarding specific carbon constraint scenarios.

Discussions by experienced sampling experts have led to a consensus of the amount of uncertainty or relative error in each of the parts of the total process of sample collection, preparation, and analysis.

Out of a total of 95% of the uncertainty (allowing for 5% routine 'blunders' and systemic precision variations) it is commonly accepted that sampling error, defined as errors in the collection of a gross sample of coal, prior to any within-system preparation or extraction of increments, may be as much as 50% of the total error. This could rise to 70% if coal variability is high, such as in a raw, unwashed coal. Wide variations can be reduced by unbiased mechanical collection systems with electronic timers for increment extraction.

Preparation of samples may include another 35% of total error. The mass of a gross sample must be reduced by crushing (reduction) and riffling (division) of samples. While not immune to procedural error, this process does take place in a controlled environment, usually with a skilled operator and a well-established work procedure.

Analysis error is generally accepted to be the smallest error, around 10%, due to the controlled lab environment and the presence and use of standard reference materials (SRMs) from National Institute of Standards and Technology (NIST) or other certifying agency. These SRMs are used in all good labs for calibration and analytical process control checks It is believed that there are two major sources of sampling error: (a) stratification resulting from collection practices; and (b) randomization resulting from collection by timed increments or haphazard timing. Documented evidence for the magnitude of sample collection errors is not available; their existence is established by experience and by inspection of the specific components of a coal sample collection system. A list of factors the user should consider in establishing sample uncertainty includes:

1. Is the procedure appropriate to the type of coal (washed or raw coal)?
    a. Washed coal, lower uncertainty
    b. Raw coal, higher uncertainty
2. Are the number and weight of sample increments equal or less than ASTM standards requirements?
    a. Equal or more, lower
    b. Less than, higher
3. Are increments systematic (on a timer) or random (human collected)?
    a. Systematic, lower
    b. Random, higher
4. Are the opening dimensions of the sample device correct in relation to particle size (more or less than three (3) times the particle size)?
    a. More than 3 times, lower
    b. Less than, higher
5. Is the movement of the sample device uniform speed?
    a. Mechanical drive, lower
    b. Human driven motion, higher
6. What is the state of the coal when sampling occurs?
    a. Stationary pile of coal, highest
    b. A falling coal stream, lower
    c. By mechanical sampler from a conveyor belt, lowest
7. Is preservation of moisture insured (sealed or open container)?
    a. Sealed, lower
    b. Open, higher Other errors in carbon balance are related to the unburned carbon in the ash, the amount of CO present in flue gas, and pulverizer reject material which may contain carbon. The uncertainty analysis has shown these to have a very small effect on the results computed by the carbon mass balance. Changing the default measurement errors for these items is expected to produce a very small change in result uncertainty.

Emission rates from CEMS data are calculated from the EPA database according to the below methodologies.

$CO_2$ Mass Calculation Methodologies $CO_2$ Concentration Measured on Wet Basis; Flow Measured on Wet Basis $$E_h = KC_h Q_h \quad \text{Part 75 Equation F-11}$$

Where:
$E_h$=Hourly $CO_2$ mass emissions, tons/hr
$K=5.7 \times 10^{-7}$ for $CO_2$, (tons/scf)/% $CO_2$
$C_h$=Hourly average $CO_2$ flue gas concentration, wet basis, %
$Q_h$=Hourly average volumetric flow rate, wet basis, scfh $CO_2$ Concentration Measured on Dry Basis; Flow Measured on Wet Basis $$E_h = KC_h Q_h \frac{(100 - \% \ H_2O)}{100} \quad \text{Part 75 Equation F-2}$$

Where:
$E_h$=Hourly $CO_2$ mass emissions, tons/hr
$K=5.7 \times 10^{-7}$ for $CO_2$, (tons/scf)/% $CO_2$
$C_h$=Hourly average $CO_2$ flue gas concentration, dry basis, %
$Q_h$=Hourly average volumetric flow rate, wet basis, scfh
% $H_2O$=Moisture content of flue gas, %

$O_2$ Concentration Measured on Wet Basis; Flow Measured on Wet Basis $$E_h = K\left(\frac{100}{20.9}\frac{F_C}{F}\left[20.9\left(\frac{100 - (\% \ H2O)}{100}\right) - O_{2_w}\right]\right)Q_h \quad \text{Part 75 Equations F-11 and F-14b}$$

Where:
$E_h$=Hourly $CO_2$ mass emissions, tons/hr
$K=5.7 \times 10^{-7}$ for $CO_2$, (tons/scf)/% $CO_2$
$F, F_c$=F-factor or carbon-based $F_C$-factor
$O_{2w}$=Hourly average $O_2$ concentration, wet basis, %
% $H_2O$=Moisture content of flue gas, %
$Q_h$=Hourly average volumetric flow rate, wet basis, scfh $O_2$ Concentration Measured on Dry Basis; Flow Measured on Wet Basis $$E_h = K\left(100\frac{F_c}{F}\left(\frac{20.9 - O_{2_d}}{20.9}\right)\right)Q_h \left(\frac{100 - \% \ H_2O}{100}\right) \quad \text{Part 75 Equations F-11 and F-14a}$$

Where:
$E_h$=Hourly $CO_2$ mass emissions, tons/hr
$K=5.7 \times 10^{-7}$ for $CO_2$, (tons/scf)/% $CO_2$
$F, F_c$=F-factor or carbon-based $F_C$-factor
$O_{2d}$=Hourly average $O_2$ flue gas concentration, dry basis, %
$Q_h$=Hourly average volumetric flow rate, wet basis, scfh.
% $H_2O$=Moisture content of flue gas, %

Fuel feed rate measured and fuel sampling (although for fuel-based approaches, there is the potential need to address scrubber-related supplemental $CO_2$ emissions.

$$W_{CO2} = \frac{44.0 * W_C}{24,000}$$

Part 75 Equation G-1

Where:
$W_{CO2}$=$CO_2$ mass emissions from combustion, tons/day
$W_c$=Carbon burned, lb/day (using fuel flow and sampling/analysis)
Coal Fuel Feed Rate Measured Fuel Sampling Adjusted to Default Carbon Retained in Ash $$W_{NCO2} = 0.99 \left( \frac{44.0 * W_C}{24,000} \right)$$

Part 75 Equations G-1 and G-3

Where:
$W_{CO2}$=Net $CO_2$ mass emissions from combustion, tons/day
$W_c$=Carbon burned, lb/day (using fuel flow and sampling/analysis)
Coal Fuel Feed Rate Measured, Fuel Sampling, and Ash Sampling $$W_{CO2} = \left( \frac{44.0 * W_C}{24,000} \right) \left[ 1 - \left( \frac{A\%}{100} \right) \left( \frac{C\%}{100} \right) \right]$$

Part 75 Equations G-1 and G-2

Where:
$W_{CO2}$=Net $CO_2$ mass emissions from combustion, tons/day
$W_c$=Carbon burned, lb/day (using fuel flow and sampling/analysis)
A %=Ash content of coal, percent by weight
C %=Carbon content of ash, percent by weight
Fuel Flow Rate Measured and Fuel Sampling for Oil and Gas Units $E_h$=5.714×10$^{11}$($Q_o$×$GCV_o$× $F_{c(oil)}Q_g$×$GCV_g$×$F_{c(gas)}$))

Part 75 Equations G-4 and F-19/20

Where:
$E_h$=$CO_2$ mass emissions, tons/hr
$F_{c(gas)}$=Carbon based F-factor
$F_{c(oil)}$=Carbon based F-factor for oil
$Q_g$=Metered flow rate of gaseous fuel combusted
$GCV_g$=Gross calorific value of gaseous fuel, Btu/metered gas flow units
$Q_o$=Metered flow rate of oil combusted
$GCV_o$=Gross calorific value of oil (or liquid fuel), Btu/metered oil flow unit
$CO_2$ Default Per §75.19 LME Procedures
Heat Input Calculation Methodologies
$CO_2$ Concentration Measured on Wet Basis; Flow Measured on Wet Basis $$HI = Q_w \frac{1}{F_c} \frac{\% CO_2}{100}$$

Part 75 Equation F-15

Where:
HI=Hourly heat input, 10$^6$ Btu/hr
$Q_w$=Hourly average volumetric flow rate, wet basis, scfh
$F_c$=Carbon-based F-factor
% $CO_2$=Hourly $CO_2$ flue gas concentration, wet basis, %
$CO_2$ Concentration Measured on Dry Basis; Flow Measured on Wet Basis $$HI = Q_h \left( \frac{100 - \% H_2O}{100 F_c} \right) \left( \frac{\% CO_2}{100} \right)$$

Part 75 Equation F-16

Where:
HI=Hourly heat input, 10$^6$ Btu/hr
$Q_h$=Hourly average volumetric flow rate, wet basis, scfh
% $H_2O$=Moisture content of flue gas, %
$F_c$=Carbon-based F-Factor
% $CO_2$=Hourly $CO_2$ flue gas concentration, dry basis, %
$O_2$ Concentration Measured on Wet Basis, Flow Measured on Wet Basis $$HI = Q_w \frac{1}{F} \left( \frac{100 - \% H_2O}{100} - \frac{\% O_2}{20.9} \right)$$

Part 75 Equation F-17

Where:
HI=Hourly heat input, 10$^6$ Btu/hr
$Q_w$=Hourly average volumetric flow rate, wet basis, scfh
F=Dry basis F-Factor, dscf/10$^6$ Btu
% $H_2O$=Moisture content of flue gas, %
% $O_2$=Hourly flue gas $O_2$ concentration, wet basis, %
$O_2$ Concentration Measured on Dry Basis; Flow Measured on Wet Basis $$HI = Q_w \left( \frac{100 - \% H_2O}{100 F} \right) \left( \frac{(20.9 - \% O_2)}{20.9} \right)$$

Part 75 Equation F-18

Where:
HI=Hourly heat input, 10$^6$ Btu/hr
$Q_w$=Hourly average volumetric flow, wet basis, scfh
% $H_2O$=Moisture content of the stack gas, %
F=Dry basis F-factor, dscf/10$^6$ Btu.
% $O_2$=Hourly flue gas $O_2$ concentration, $O_2$ dry basis, %
Coal Fuel Flow Rate Measured and Fuel Sampling (Part 75—Daily Values)

$$HI_C = M_C \frac{GCV_C}{500}$$

Part 75 Equation F-21

Where:
$HI_c$=Daily heat input from coal (or solid fuel), 10$^6$ Btu/day
$M_c$=Mass of coal consumed, tons/day
$GCV_c$=Gross calorific value of coal, Btu/lb
Fuel Flow Rate Measured and Fuel Sampling for Gas Units $$HI = \frac{Q_g GCV_g + Q_o GCV_o}{10^6}$$

Part 75 Equations D-8 and D-6 (or F-19 and F-20)

Where:
HI=Hourly heat input rate, $10^6$ Btu/hour
$Q_g$=Metered flow rate of gaseous fuel combusted
$GCV_g$=Gross calorific value of gaseous fuel, Btu/metered gas flow units
$Q_o$=Metered flow rate of oil combusted
$GCV_o$=Gross calorific value of oil (or liquid fuel), Btu/metered oil flow unit
Long-Term Fuel Flow Per §75.19 LME Procedures
Maximum Heat Input Per §75.19 LME Procedures
$NO_x$ Mass Calculation Methodologies
$O_x$ Measured on Wet Basis; Flow Measured on Wet Basis $$M_h = KC_w Q_w \quad \text{Part 75 Equation F-26a}$$

Where:
$M_h$ Hourly $NO_x$ mass emissions, lb/hr
$K=1.194 \times 10-7$, (lb/dscf)/ppm $NO_x$
$C_w$ Hourly average flue gas $NO_x$ concentration, wet basis, ppm
$Q_w$=Hourly average volumetric flue gas flow, wet basis, scfh NOx Measured on Dry Basis; Flow Measured on Wet Basis $$M_h = KC_d \frac{100 - \% \, H_2O}{100} Q_w \quad \text{Part 75 Equation F-26b}$$

Where:
$M_h$=Hourly $NO_x$ mass emissions, lb/hr
$K=1.194 \times 10-7$, (lb/dscf)/ppm $NO_x$
$C_d$=Hourly average $NO_x$ concentration, dry basis, ppm
% $H_2O$=Hourly average flue gas moisture content, %
$Q_w$=Hourly average volumetric flue gas flow, wet basis, scfh NOx Measured on Dry Basis, Flow Measured on Wet Basis $$M_h = E_{h(NOX)} \times HI \quad \text{Part 75 Equation F-24}$$

Where:
$M_h$=Hourly $NO_x$ mass emissions, lb/hr
$E_h$=Hourly $NO_x$ emission rate, lb/$10^6$ Btu
HI=Hourly heat input, $10^6$ Btu/hr
$NO_x$ Emission Rate (lb/$10^6$ Btu) Calculation Methodologies
NOx Measured on Dry Basis; $O_2$ Measured on Dry Basis $$E_h = KC_d F_d \frac{20.9}{20.9 - \% \, O_{2d}} \quad \text{Part 75 Equation 19-1 (or F-5)}$$

Where:
$E_h$=Hourly $NO_x$ emission rate, lb/$10^6$ Btu
$K=1.194 \times 10-7$, (lb/dscf)/ppm $NO_x$
$C_d$=Hourly average $NO_x$ concentration, dry basis, ppm
$F_d$=Dry basis F-Factor, dscf/$10^6$ Btu
$O_{2d}$=Hourly average flue gas $O_2$ concentration, dry basis, %

NOx Measured on Wet Basis; $O_2$ Measured on Wet Basis Using Fw $$E_h = KC_w F_w \frac{20.9}{20.9(1 - B_{wa}) - \% \, O_{2w}} \quad \text{Part 75 Equation 19-2}$$

Where:
$E_h$=Hourly $NO_x$ emission rate, lb/$10^6$ Btu
$K=1.194 \times 10-7$, (lb/dscf)/ppm $NO_x$
$C_w$=Hourly average $NO_x$ concentration, wet basis, ppm
$F_w$=Wet basis F-Factor, wscf/$10^6$ Btu
$O_{2w}$=Hourly average flue gas $O_2$ concentration, wet basis, %
$B_{wa}$=Moisture fraction of ambient air (0.027 default value)

NOx Measured on Wet Basis; $O_2$ Measured on Wet Basis Using Fd $$E_h = KC_w F_w \frac{20.9}{20.9\left(\frac{100 - \% \, H_2O}{100}\right) - \% \, O_{2w}} \quad \text{Part 75 Equation 19-3}$$

Where:
$E_h$=Hourly $NO_x$ emission rate, lb/$10^6$ Btu
$K=1.194 \times 10-7$, (lb/dscf)/ppm $NO_x$
$C_w$=Hourly average $NO_x$ concentration, wet basis, ppm
$F_w$=Wet basis F-Factor, wscf/$10^6$ Btu
$O_{2w}$=Hourly average flue gas $O_2$ concentration, wet basis, %
% $H_2O$=Hourly average flue gas moisture content, %

NOx Measured on Wet Basis; $O_2$ Measured on Dry Basis $$E_h = KC_w F_d \left(\frac{100}{100 - \% \, H_2O}\right)\left(\frac{20.9}{20.9 - \% \, O_{2d}}\right) \quad \text{Part 75 Equation 19-4}$$

Where:
$E_h$=Hourly $NO_x$ emission rate, lb/$10^6$ Btu
$K=1.194 \times 10-7$, (lb/dscf)/ppm $NO_x$
$C_w$=Hourly average $NO_x$ concentration, wet basis, ppm
$F_d$=dry basis F-Factor, dscf/$10^6$ Btu
$O_{2d}$=Hourly average flue gas $O_2$ concentration, dry basis, %
% $H_2O$=Hourly average flue gas moisture content, %

NOx Measured on Wet Basis; $O_2$ Measured on Dry Basis $$E_h = \frac{20.9 KC_w F_d}{20.9 - \left(\frac{100\% \, O_{2d}}{100 - \% \, H_2O}\right)} \quad \text{Part 75 Equation 19-5}$$

Where:
$E_h$=Hourly $NO_x$ emission rate, lb/$10^6$ Btu
$K=1.194 \times 10-7$, (lb/dscf)/ppm $NO_x$
$C_w$=Hourly average $NO_x$ concentration, wet basis, ppm
$F_d$=dry basis F-Factor, dscf/$10^6$ Btu
$O_{2d}$=Hourly average flue gas $O_2$ concentration, dry basis, %
% $H_2O$=Hourly average flue gas moisture content, %

NOx Measured on Dry Basis; $CO_2$ Measured on Dry Basis $$E_h = KC_d F_c \frac{100}{\% \, CO_{2d}} \quad \text{Part 75 Equation 19-6}$$

Where:
$E_h$=Hourly $NO_x$ emission rate, lb/$10^6$ Btu
$K=1.194 \times 10-7$, (lb/dscf)/ppm $NO_x$
$C_d$=Hourly average $NO_x$ concentration, dry basis, ppm $F_c$=Carbon-based F-Factor, scf $CO_2/10^6$ Btu
$CO_{2d}$=Hourly average flue gas $CO_2$ concentration, dry basis, %

NOx Measured on Wet Basis; $CO_2$ Measured on Wet Basis $$E_h = KC_wF_c\frac{100}{\% \, CO_{2w}} \quad \text{Part 75 Equation 19-7}$$

Where:
$E_h$=Hourly $NO_x$ emission rate, lb/$10^6$ Btu
K=1.194×10−7, (lb/dscf)/ppm $NO_x$
$C_d$=Hourly average $NO_x$ concentration, wet basis, ppm
$F_c$=Carbon-based F-Factor, scf $CO_2/10^6$ Btu
$CO_{2d}$=Hourly average flue gas $CO_2$ concentration, wet basis, %

NOx Measured on Wet Basis; $O_2$ Measured on Dry Basis $$E_h = KC_wF_c\left(\frac{100}{100-\% \, H_2O}\right)\left(\frac{100}{\% \, CO_{2d}}\right) \quad \text{Part 75 Equation 19-8}$$

Where:
$E_h$=Hourly $NO_x$ emission rate, lb/$10^6$ Btu
K=1.194×10−7, (lb/dscf)/ppm $NO_x$
$C_w$=Hourly average $NO_x$ concentration, wet basis, ppm
$F_c$=Carbon-based F-Factor, scf $CO_2/10^6$ Btu
$CO_{2d}$=Hourly average flue gas $CO_2$ concentration, dry basis, %
% $H_2O$=Hourly average flue gas moisture content, %

NOx Measured on Dry Basis; $O_2$ Measured on Wet Basis $$E_h = KC_dF_c\left(\frac{100}{100-\% \, H_2O}\right)\left(\frac{100}{\% \, CO_{2w}}\right) \quad \text{Part 75 Equation 19-9}$$

Where:
$E_h$=Hourly $NO_x$ emission rate, lb/$10^6$ Btu
K=1.194×10−7, (lb/dscf)/ppm $NO_x$
$C_d$=Hourly average $NO_x$ concentration, dry basis, ppm
$F_c$=Carbon-based F-Factor, scf $CO_2/10^6$ Btu
$CO_{2w}$=Hourly average flue gas $CO_2$ concentration, wet basis, %
% $H_2O$=Hourly average flue gas moisture content, %

NOx to Heat Input Correlation Per Appendix E of Part 75
Generic NOx Default Per §75.19 LME Procedures
Unit Specific NOx Default Per §75.19 LME Procedures $SO_2$ Mass Calculation Methodologies
$SO_2$ Concentration Measured on Wet Basis; Flow Measured on Wet Basis $$E_h = KC_hQ_h \quad \text{Part 75 Equation F-1}$$

Where:
$E_h$=Hourly $SO_2$ mass emissions, lb/hr
K=1.660×10−7 for $SO_2$, (lb/scf)/ppm.
$C_h$=Hourly average flue gas $SO_2$ concentration, wet basis, ppm
$Q_h$=Hourly average flue gas volumetric flow rate, wet basis, scfh $SO_2$ Concentration Measured on Dry Basis; Flow Measured on Wet Basis $$E_h = KC_hQ_h\frac{100-\% \, H_2O}{100} \quad \text{Part 75 Equation F-2}$$

Where:
$E_h$=Hourly $SO_2$ mass emissions, lb/hr
K=1.660×10−7 for $SO_2$, (lb/scf)/ppm.
$C_h$=Hourly average flue gas $SO_2$ concentration, dry basis, ppm
% $H_2O$=Hourly average flue gas moisture content, %

$SO_2$ Via Fuel Flow and Sampling for Gas- and Oil-Fired Units $$E_h = \frac{2}{7000}Q_{gas}\times\% \, S_{gas} + \frac{2}{100}Q_{oil}\times\% \, S_{oil} \quad \text{Part 75 Equation D-1h and D-2}$$

Where:
$E_h$=Hourly $SO_2$ mass emissions, lbs/hr
% $S_{total}$=Sulfur content of fuel, grains/scf
$Q_{gas}$=Metered flow rate of gaseous fuel combusted, scf/hr
$Q_{oil}$=Mass rate of oil consumed, lb/hr
% $S_{oil}$=Percent sulfur by weight measured in oil $SO_2$ Default Per §75.19 LME Procedures
Flue Gas Moisture Methodologies
Moisture Analyzer
Differential Wet and Dry Oxygen Determination $$\% \, H_2O = \frac{(O_{2d}-O_{2w})}{O_{2d}}*100 \quad \text{Part 75 Equation M-1}$$

Where:
% $H_2O$=Hourly average flue gas moisture content, %
% $O_{2d}$=Hourly average $O_2$ concentration, dry basis, %
% $O_{2w}$=Hourly average $O_2$ concentration, wet basis, %

Part 75 Moisture Default Values—According to Table 3 Below.

TABLE 3

| Fuel | Minimum Moisture Default Value (Used with All Equations Except 19-3, 19-4, and 19-8) | Maximum Moisture Default Value (Used with 19-3, 19-4, and 19-8) |
|---|---|---|
| Anthracite Coal | 3.0% | 5.0% |
| Bituminous Coal | 6.0% | 8.0% |
| Sub-bituminous Coal | 8.0% | 12.0% |
| Lignite Coal | 11.0% | 13.0% |
| Wood | 13.0% | 15.0% |

F-Factor Methodologies—Reference Tables

TABLE 4

| Fuel | F-factor (dscf/mmBTU) | $F_c$-factor (scf $CO_2$/mmBTU) | $F_w$-factor (wscf/mmBTU) |
|---|---|---|---|
| Table Values Prior to Jan. 24, 2008 | | | |
| Anthracite Coal | 10100 | 1970 | 10540 |
| Bituminous and Sub-Bituminous Coal | 9780 | 1800 | 10640 |
| Lignite Coal | 9860 | 1910 | 11950 |
| Natural Gas | 8710 | 1040 | 10610 |
| Propane | 8710 | 1190 | 10200 |
| Butane | 8710 | 1250 | 10390 |
| Oil | 9190 | 1420 | 10320 |
| Municipal Solid Waste | 9570 | 1820 | — |
| Wood Bark | 9600 | 1920 | — |
| Wood Residue | 9240 | 1830 | — |
| Additional Table Values After Jan. 24, 2008 | | | |
| Sub-Bituminous Coal | 9820 | 1840 | 10640 |
| Petroleum Coke | 9830 | 1850 | — |
| Tire Derived Fuel | 10260 | 1800 | — |
| Municipal Solid Waste | 9570 | 1820 | — |
| Wood Bark | 9600 | 1920 | — |
| Wood Residue | 9240 | 1830 | — |

Ultimate Fuel Analysis $$F = \frac{3.64(\% H) + 1.53(\% C) + 0.57(\% S) + 0.14(\% N) - 0.46(\% O)}{GCV} * 10^6 \quad \text{Part 75 Equation F-7A}$$

$$F_c = \frac{320 \times 10^3 \times (\% C)}{GCV} \quad \text{Part 75 Equation F-7B}$$

$$F_w = \frac{5.57(\% H) + 1.53(\% C) + 0.57(\% S) + 0.14(\% N) - 0.46(\% O) + 0.21(\% H_2O)}{GCV} * 10^6 \quad \text{Part 75 Equation 19-14}$$

Where:
% H=Content of hydrogen, as determined by ultimate analysis, % by weight
% C=Content of carbon, as determined by ultimate analysis, % by weight
% S=Content of sulfur, as determined by ultimate analysis, % by weight
% N=Content of nitrogen, as determined by ultimate analysis, % by weight
% O=Content of oxygen, as determined by ultimate analysis, % by weight
GCV=Gross calorific value of fuel combusted, BTU/lb
% $H_2O$=Content of water, as determined by ultimate analysis, % by weight Prorated F-Factors Based on a Combination of Fuels $$F = \sum X_i F_i \quad \text{Part 75 Equation F-8}$$

$$F_c = \sum X_i (F_c)_i \quad \text{Part 75 Equation F-8}$$

Where:
$X_i$=Fraction of total heat input derived from each type of fuel
$F_i$, $(F_c)_i$=F-factors determined for each fuel type Where practicable, the uncertainty of the CEMS data will be determined via a classical uncertainty analysis. For simplicity, all uncertainties will be expressed in relative terms as a fractional change in the value of interest. The uncertainty of a function is equal to the uncertainty of each variable multiplied by the partial derivative of the function with respect to that variable (i.e., how much impact that variable has on the results). The maximum error of a function is a straight sum of the potential errors that could be caused by each variable in the function. In terms of discrete uncertainty values, this could be expressed as:

$$U_y = \left|U_{x_1}\frac{\partial y}{\partial x_1}\right| + \left|U_{x_2}\frac{\partial y}{\partial x_2}\right| + \ldots + \left|U_{x_n}\frac{\partial y}{\partial x_n}\right|$$

Where:
$U_y$=Maximum discrete uncertainty of function
$U_{Xi}$=Discrete uncertainty of variable $x_i$
$\partial y/\partial x_i$=Partial derivative of function with respect to $x_i$ (discrete)

If it is assumed that each parameter is statistically independent (the direction of the error in each variable at any given time is unknown and unrelated), then a more reasonable estimate of the error is generally assumed to correspond to a Pythagorean "square root of the sum of the squares" treatment of the error components.

$$U_y = \sqrt{\left(U_{x_1}\frac{\partial y}{\partial x_1}\right)^2 + \left(U_{x_2}\frac{\partial y}{\partial x_2}\right)^2 + \ldots + \left(U_{x_n}\frac{\partial y}{\partial x_n}\right)^2}$$

To determine the uncertainty in relative terms, the equation can be rewritten as:

$$\frac{U_y}{y} = \sqrt{\left[\left(\frac{U_{x_1}}{x_1}\right)\frac{\partial y/y}{\partial x_1/x_1}\right]^2 + \left[\left(\frac{U_{x_2}}{x_2}\right)\frac{\partial y/y}{\partial x_2/x_2}\right]^2 + \ldots + \left[\left(\frac{U_{x_n}}{x_n}\right)\frac{\partial y/y}{\partial x_n/x_n}\right]^2}$$

Where:
$U_y/y$=Relative uncertainty of function
$U_{Xi}/x$=Relative uncertainty of variable $x_i$ $$\frac{\partial y/y}{\partial x_i/x_i} = \text{Relative partial derivative of function with respect to } x_i$$

For convenience, the preceding equation can be rewritten as:

$$U_y^* = \sqrt{\left(U_{x_1}^*\frac{\partial y^*}{\partial x_1^*}\right)^2 + \left(U_{x_2}^*\frac{\partial y^*}{\partial x_2^*}\right)^2 + \ldots + \left(U_{x_n}^*\frac{\partial y^*}{\partial x_n^*}\right)^2}$$

Where:
$U_y^*$=Relative uncertainty of function
$U_{Xi}^*$=Relative uncertainty of variable $x_i$ $$\frac{\partial y^*}{\partial x_1^*} = \text{Relative partial derivative of function with respect to } x_i$$

Estimating the uncertainty of CEMS measurements is a difficult task. Uncertainty of the CEMS components may be calculated based on the results of the results of the daily calibrations and the periodic referenced method comparisons (a.k.a., RATA tests) and estimates of the associated uncertainties of each QA technique. As suggested by the following equation, the approach presumes that each of these components is independent:

$$U_{CEMS} = \sqrt{U_{Cal}^2 + U_{Drift}^2 + U_{RM}^2 + U_{RATA}^2}$$

Where:
$U_{CEMS}$=Uncertainty of CEMS component (e.g., $CO_2$ concentration)
$U_{Cal}$=Uncertainty of calibration procedure
$U_{Drift}$=Uncertainty reflected in analyzer calibration results.
$U_{RM}$=Uncertainty associated with reference method comparison
$U_{RATA}$=Uncertainty reflected in reference method comparison results $U_{Cal}$: An uncertainty of 2% will be assumed for the calibration gas. This value is based on the uncertainty defined in the EPA protocol gas standard although industry and Agency studies have historically shown numerous cases where calibration gas errors were in excess of the standard. The impact of this uncertainty on will be reduced based on the fact that different calibration gas bottles will be used over time. The following equation will be used:

$$U_{Cal} = \frac{U_{gas}}{\sqrt{n_{gas}}}$$

Where:
$U_{Cal}$=Uncertainty of calibration procedure
$U_{Cal}$=Uncertainty of calibration gas
$n_{gas}$=Number of high level gas bottles used during the period (estimated based on number of injections and a typical number of injections per bottle)

For flow, a value of 0.5% will be assigned to $U_{cal}$. A value of 2% will be used for flue gas moisture analyzers, which have no Part 75 calibration requirements.

$U_{Drift}$: The average impact of the analyzer drift (the variation of the CEMS from the calibration gas response) will be estimated based on the calibration results in the following manner:

$$U_{Drift} = \frac{\sum_{i=1}^{n_H}\left[\left(H_{res_i} - \frac{\sum_{j=1}^{n_Z} Z_{res_j}}{n_Z}\right) C_{avg} + \left(\frac{\sum_{j=1}^{n_Z} Z_{res_j}}{n_Z} - \frac{\sum_{j=1}^{n_Z} Z_{ref_j}}{n_Z}\right)\right]}{n_H C_{avg}}$$

Where:
$U_{Drift}$=Average estimated relative drift impact for period
$C_{avg}$=Average CEMS value for parameter
$H_{res_i}$=High level calibration reference value
$H_{res_i}$=Analyzer response to high level calibration
$Z_{res_i}$=Zero level calibration reference value
$Z_{res_i}$=Analyzer response to zero level calibration $n_H$=Number of high level gas injections during period
$n_Z$=Number of zero level gas injections during period
A $U_{Drift}$ value of 5% is used for flue gas moisture analyzers, which have no Part 75 calibration requirements.

$U_{RM}$: Assessing the uncertainty associated with the reference method comparison test poses a quandary. During any short-term period (one year or less), there may only be one reference method comparison test (if any). If the results of a single test are used, the CEMS could be unduly tagged with the high uncertainty inherently associated with the reference method comparison procedures. To avoid overstating the uncertainty, it is recommended that, in lieu of using just the reference method comparison test results for the specific period, all the historical test results for the CEMS be used in the analysis. If the historical results remain representative of the CEMS performance for the period, the uncertainty of the reference method comparisons for the period will be calculated in the following manner:

$$U_{RM} = \frac{U_{RM1}}{\sqrt{n_{RATA}}}$$

Where:
$U_{RM}$=Uncertainty of associated with historical reference method comparisons
$U_{RM1}$=Uncertainty of single reference method comparison test
$n_{RATA}$=Number of historical reference method comparison tests for CEMS For the gas concentration values, the uncertainty for a single reference method comparison test will be estimated as 3.5%, based on two sets of 2% calibration gases [one with the CEMS and one with the RM $(2\%^2+2\%^2)^{0.5}$] plus a small additional factor. For stack flow analyzers, a single reference method comparison test uncertainty estimate of 5% will be used. If no reference method comparison tests have been performed an uncertainty of 10% will be assigned.

$U_{RM}$: The uncertainty of the ability of the CEMS to match the reference method will be estimated based on the results of the reference method comparisons during the period using the following equation:

$$U_{RATA} = \frac{\sum_{i=1}^{n_{RATA}}(CEMS_i - RM_i)}{n_{RATA}}$$

Where:
$U_{RATA}$=Estimated error of CEMS in comparison with of reference method
$RM_i$=Average reference method value for reference method comparison test
$CEMS_i$=Average reference method value for reference method comparison test
$n_{RATA}$=Number of historical reference method comparison tests for CEMS Bias in CEMS measurements can be hard to identify. One potential indication of bias is when the difference between a CEMS value and a reference is greater than the uncertainty associated with the method of comparison. If $U_{Drift} > U_{Cal}$ then a systematic bias is indicated by the calibration results. If the average difference between the analyzer values and reference methods during the comparisons is greater that $U_{RM}$, then a CEMS bias would likewise be suggested. However, if the reference method is also affected by the bias, then the comparison is blind to the potential influence (e.g., EPA Method 2 is blind to cyclonic flow bias), so reference method selection and process can be important. Exemplary uncertainty methodologies are shown in FIGS. 10-15.

Documentation for third-party verification is then printed, displayed, stored and or transmitted to convert the measured reduction, subject to uncertainty analysis, to a verified carbon credit or other emissions credit and to identify that portion of the carbon credits or emissions credits not tradeable.

A number of variations and modifications of the invention can be used. It would be possible to provide for some features of the invention without providing others.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A system for generating standardized greenhouse gas emission reduction credits based on mitigation of greenhouse gas emissions at a site resulting from use of renewable carbon at the site to produce energy in substitution for previous use of a fossil fuel at the site, comprising:
  a computer capable of executing instructions embodied in software;
  at least one database accessible by the computer and containing:
    past site-specific data regarding at least one variable impacting emissions of a greenhouse gas generated from the use of the fossil fuel for generating energy at the site, wherein the at least one variable impacting emissions includes characteristics of a fuel used at the site; and
    subsequent site-specific data regarding the at least one variable impacting emissions of the greenhouse gas generated from the use of the renewable carbon for generating energy at the site, wherein the fuel used at the site is analyzed in batches to produce batch data and the subsequent site-specific data from the site includes the batch data;
  a greenhouse gas emissions modeling module embodied as software to process the past site-specific data and the subsequent site-specific data, to determine a change in level of the greenhouse gas emission at the site over a specified time period;
  wherein the computer is configured to run:
    an uncertainty analysis module embodied as software to process the change in level of the greenhouse gas emission over the specified time period, to quantify a relative level of uncertainty of the change of the level of the greenhouse gas emission with which to identify a quantity of greenhouse gas emission reduction credits that do not qualify as standardized emission reduction credits, and cannot be traded as such, and to identify a quantity of greenhouse gas emission reduction credits that qualify as the standardized greenhouse gas emission reduction credits for trading; and
  at least one interface to the computer, for outputting a report of the identified quantity of the standardized greenhouse gas emission reduction credits.

2. The system of claim 1 further comprising:
  a plurality of sensors located at the site for monitoring and reporting conditions at the site for use by the computer and inclusion in the at least one database.

3. The system of claim 2, wherein the plurality of sensors are operative to monitor and report data selected from the group consisting of a flow rate, temperature, pressure, particulate matter, gas composition, energy produced, energy consumed, raw fuel consumed and a waste stream and the reported data forms a part of the subsequent site-specific data.

4. The system of claim 1, wherein a waste stream created at the site is analyzed in batches to produce batch data and the subsequent site-specific data from the site includes the batch data.

5. The system of claim 1, wherein said site specific data includes $CO_2$ emissions quantified based on a carbon mass balance at the site.

6. A system for generating standardized greenhouse gas emission reduction credits based on reduction of greenhouse gas emissions at a site resulting from a change of an energy generation practice at the site, the system comprising:
  a computer capable of executing instructions embodied in software;
  at least one database accessible by the computer and containing:
  past site-specific data regarding at least one variable impacting emissions of a greenhouse gas at the site resulting from energy generation at the site, wherein the at least one variable impacting emissions comprises characteristics of a fuel used at the site; and
  subsequent site-specific data collected after the change of the energy generation practice at the site, regarding the at least one variable impacting emissions of the greenhouse gas resulting from energy generation at the site, wherein the fuel used at the site is analyzed in batches to produce batch data and the subsequent site-specific data from the site includes the batch data;
  wherein the computer is configured to run:
    a greenhouse gas emissions modeling module embodied as software to process the past site-specific data and the subsequent site-specific data, to determine a change in level of the greenhouse gas emission at the site over a specified time period; and
    an uncertainty analysis module embodied as software to process the change in level of the greenhouse gas emission over the specified time period, to quantify a relative level of uncertainty of the change of the level of the greenhouse gas emission with which to identify a quantity of greenhouse gas emission reduction credits that do not qualify as standardized emission reduction credits, and cannot be traded as such, and to identify a quantity of greenhouse gas emission reduction credits that qualify as the standardized greenhouse gas emission reduction credits for trading; and at least one interface to the computer, for outputting a report of the identified quantity of the standardized greenhouse gas emission reduction credits.

7. The system of claim 6 further comprising:
a plurality of sensors located at the site for monitoring and reporting conditions at the site for use by the computer and inclusion in the at least one database.

8. The system of claim 7, wherein the plurality of sensors are operative to monitor and report data selected from the group consisting of a flow rate, temperature, pressure, particulate matter, gas composition, energy produced, energy consumed, raw fuel consumed and a waste stream and the reported data forms a part of the subsequent site-specific data.

9. The system of claim 6, wherein a waste stream created at the site is analyzed in batches to produce batch data and the subsequent site-specific data from the site includes the batch data.

10. A system for reporting changes in sequestration of carbon at a site, the system comprising:
a computer capable of executing instructions embodied in software;
at least one database accessible by the computer and containing:
past site-specific data regarding at least one variable impacting carbon sequestration at the site achieved during energy generation at the site, wherein the at least one variable corresponds to generating energy through a use of a fossil fuel wherein said site specific data includes $CO_2$ emissions quantified based on a carbon mass balance at the site; and
subsequent site-specific data regarding the at least one variable impacting carbon sequestration at the site resulting from energy generation at the site, wherein said subsequent site-specific data is collected after a change in an energy generation practice at the site including change in the use of the fossil fuel or a change from the fossil fuel to another fossil fuel;
wherein the computer is configured to run:
a carbon sequestration modeling module embodied as software to process the past site-specific data and the subsequent site-specific data, to determine a change in level of carbon sequestration at the site over a specified time period;
an uncertainty analysis module embodied as software to process the change in level of carbon sequestration over the specified time period, to quantify a relative level of uncertainty of the change of the level of carbon sequestration with which to identify a quantity of carbon emission reduction credits that do not qualify as standardized carbon emission reduction credits, and cannot be traded as such, and to identify a quantity of carbon emission reduction credits that qualify as standardized carbon emission reduction credits for trading; and
at least one interface to the computer, for outputting a report of the identified quantity of the standardized carbon emission reduction credits.

11. The system of claim 10 further comprising:
a plurality of sensors located at the site for monitoring and reporting conditions at the site for use by the computer and inclusion in the at least one database.

12. The system of claim 11, wherein the plurality of sensors are operative to monitor and report data selected from the group consisting of a flow rate, temperature, pressure, particulate matter, gas composition, energy produced, energy consumed, raw fuel consumed and a waste stream and the reported data forms a part of the subsequent site-specific data.

13. The system of claim 10, wherein a fuel used at the site is analyzed in batches to produce batch data and the subsequent site-specific data from the site includes the batch data.

14. The system of claim 10, wherein a waste stream created at the site is analyzed in batches to produce batch data and the subsequent site-specific data from the site includes the batch data.

15. A method for generating standardized greenhouse gas emission reduction credits based on reduction of greenhouse gas emissions at a site resulting from a change of an energy generation practice at the site, the method comprising:
retrieving from a database past site-specific data regarding at least one variable impacting emissions of a greenhouse gas at the site resulting from energy generation at the site;
retrieving from a plurality of sensors at the site site-specific batch data collected after the change of the energy generation practice at the site, regarding at least one variable impacting emissions of the greenhouse gas resulting from energy generation at the site, wherein the site-specific batch data includes results of analyzing in batches a waste stream created to produce batch data;
determining by a computer a change in level of the greenhouse gas emission over a specified time period at the site by comparing the past site-specific data and the site-specific batch data;
with the computer, conducting an uncertainty analysis by quantifying a relative level of uncertainty of the change of the level of the greenhouse gas emission by analyzing the change in level of the greenhouse gas emission over the specified time period, wherein the relative level of uncertainty identifies a quantity of greenhouse gas emission reduction credits that do not qualify as standardized emission reduction credits, and cannot be traded as such, and wherein the relative level of uncertainty identifies a quantity of greenhouse gas emission reduction credits that qualify as standardized greenhouse gas emission reduction credits for trading; and
reporting the identified quantity of the standardized greenhouse gas emission reduction credits.

16. The method of claim 15, wherein the plurality of sensors are operative to monitor and report data selected from the group consisting of a flow rate, temperature, pressure, particulate matter, gas composition, energy produced, energy consumed, raw fuel consumed and a waste stream and the reported data forms a part of the subsequent site-specific data.

17. The method of claim 15, further comprising analyzing in batches a fuel used at the site to produce and store batch data.

18. The method of claim 15, wherein said site specific data includes $CO_2$ emissions quantified based on a carbon mass balance at the site.

* * * * *